US010920031B2

(12) United States Patent
Harada et al.

(10) Patent No.: US 10,920,031 B2
(45) Date of Patent: Feb. 16, 2021

(54) PREPREG AND FIBER-REINFORCED COMPOSITE MATERIAL

(71) Applicant: Mitsubishi Chemical Corporation, Chiyoda-ku (JP)

(72) Inventors: Yukihiro Harada, Tokyo (JP); Atsushi Nohara, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/572,164

(22) Filed: Sep. 16, 2019

(65) Prior Publication Data

US 2020/0010634 A1 Jan. 9, 2020

Related U.S. Application Data

(63) Continuation-in-part of application No. PCT/JP2018/011715, filed on Mar. 23, 2018.

(30) Foreign Application Priority Data

| Mar. 24, 2017 | (JP) | 2017-058507 |
| Mar. 24, 2017 | (JP) | 2017-058508 |
| Feb. 23, 2018 | (JP) | 2018-030289 |

(51) Int. Cl.

| B32B 27/38 | (2006.01) |
| B32B 27/20 | (2006.01) |
| C08J 5/24 | (2006.01) |
| C08G 59/18 | (2006.01) |
| C08L 63/00 | (2006.01) |

(52) U.S. Cl.
CPC .......... *C08J 5/24* (2013.01); *B32B 27/20* (2013.01); *B32B 27/38* (2013.01); *C08G 59/18* (2013.01); *C08J 2363/00* (2013.01); *C08J 2377/02* (2013.01); *C08J 2379/08* (2013.01)

(58) Field of Classification Search
CPC . C08J 5/24; B32B 27/04; B32B 27/20; B32B 27/26; B32B 27/38
USPC .............................. 428/297.4, 413
See application file for complete search history.

(56) References Cited

U.S. PATENT DOCUMENTS

| 5,028,478 | A | 7/1991 | Odagiri et al. |
| 5,242,748 | A | 9/1993 | Folda et al. |
| 2008/0286578 | A1* | 11/2008 | Tilbrook ............ C08G 59/38 |
| | | | 428/413 |
| 2011/0049426 | A1* | 3/2011 | Patel ................ C08L 63/00 |
| | | | 252/299.01 |
| 2013/0281573 | A1 | 10/2013 | Goto et al. |
| 2014/0163139 | A1 | 6/2014 | Wang et al. |
| 2016/0082691 | A1 | 3/2016 | Restuccia et al. |
| 2016/0200910 | A1 | 7/2016 | Mutsuda et al. |
| 2016/0289403 | A1 | 10/2016 | Minami et al. |
| 2016/0289404 | A1 | 10/2016 | Minami et al. |
| 2016/0297942 | A1 | 10/2016 | Minami et al. |
| 2017/0369662 | A1* | 12/2017 | Emmerson ............. C08J 5/24 |
| 2019/0225764 | A1* | 7/2019 | Harada ................. B32B 5/26 |

FOREIGN PATENT DOCUMENTS

| EP | 3 072 918 A1 | 9/2016 |
| JP | 63-162732 A | 7/1988 |
| JP | 11-323087 A | 11/1999 |
| JP | 2009-286895 A | 12/2009 |
| JP | 2015-98533 A | 5/2015 |
| JP | 2015-98535 A | 5/2015 |
| JP | 2015-98536 A | 5/2015 |
| JP | 2016-199682 A | 12/2016 |
| JP | 2017-206615 A | 11/2017 |
| WO | WO 2012/102201 A1 | 8/2012 |
| WO | WO 2015/033998 A1 | 3/2015 |

OTHER PUBLICATIONS

International Search Report dated Jun. 26, 2018 in PCT/JP2018/011715 filed Mar. 23, 2018 (with English translation).
Japanese Office Action dated Jun. 4, 2019 in Japanese Application 2018-518751 (with English Translation).
Extended European Search Report dated Feb. 13, 2020 in European Patent Application No. 18771916.6, 18 pages.
Kobo Products: "Safety Data Sheet Nylon 12 SP10 Particles", Feb. 18, 2015 (Feb. 18, 2015), XP055657147, Retrieved from the Internet: URL:http://www.koboproductsinc.com/SDSs/SP-10-SDS.pdf [retrieved on Jan. 13, 2020], pp. 1-7.
Khp Kunststofftechnik: "Werkstoffdatenblatt: PA 12", Jan. 26, 2010 (Jan. 26, 2010), XP055656837, Retrieved from the Internet: URL: https://www.khp-kunststoffe.de/Downloads/Konstruktionskunststoffe/Datenblatt_13_PA_12.pdf [retrieved on Jan. 10, 2020], (with English translation), 5 pages.
Canadian Office Action dated Oct. 23, 2020, in Patent Application No. 3,056,671.

* cited by examiner

*Primary Examiner* — Michael J Feely
(74) *Attorney, Agent, or Firm* — Oblon, McClelland, Maier & Neustadt, L.L.P.

(57) ABSTRACT

A prepreg including: a component (A); a component (B); and a component (C), in which the component (A) is a reinforced fiber substrate, the component (B) is an epoxy resin composition, the component (C) is a component (c1) or a component (c2), the component (c1) includes polyamide particles and thermosetting polyimide particles, and the component (c2) includes spherical polyamide particles having a melting point of 140° C. to 175° C.

12 Claims, 2 Drawing Sheets

PREPREG AND FIBER-REINFORCED COMPOSITE MATERIAL

This application is a continuation application of International Application No. PCT/JP2018/011715, filed on Mar. 23, 2018, which claims the benefit of priority of the prior Japanese Patent Application No. 2017-058507, filed on Mar. 24, 2017, Japanese Patent Application No. 2017-058508, filed on Mar. 24, 2017, and Japanese Patent Application No. 2018-030289, filed on Feb. 23, 2018, the entire contents of which are incorporated herein by reference.

BACKGROUND OF THE INVENTION

Field of the Invention

The present invention relates to a prepreg and a fiber-reinforced composite material.

Description of Related Art

A fiber-reinforced composite material has a low weight, a high strength, and high rigidity. Thus, the fiber-reinforced composite material is widely used in the sport leisure field, the automobile field, the airplane field, or other general industrial fields. In recent years, the fiber-reinforced composite material having a lower weight, a higher strength, and a higher rigidity is often used in the automobile field or the airplane field.

The fiber-reinforced composite material is a material including a reinforced fiber and a matrix resin as compulsory constituent elements. The fiber-reinforced composite material is an anisotropic material, in which a strength and a modulus of elasticity of a reinforced fiber in a fiber axial direction are extremely high, but a strength and a modulus of elasticity in a direction perpendicular to the fiber axial direction is low.

The fiber-reinforced composite material is produced by laminating a prepreg obtained by immersing a thermosetting uncured resin composition in a reinforced fiber substrate, performing heat molding, and curing the thermosetting resin composition. During the producing of the fiber-reinforced composite material, physical properties in each direction of the fiber-reinforced composite material which is an anisotropic material are controlled, by using a prepreg using a fabric of the reinforced fiber, or by performing the laminating by combining a fiber axial direction of a prepreg using a reinforced fiber aligned in one direction, in other directions.

However, in the fiber-reinforced composite material produced by laminating the prepreg, a fraction of the reinforced fiber in an interlayer region formed of a matrix resin in the vicinity of the surface of the laminated prepreg may be small, and the alignments of the reinforced fibers on both sides of the interlayer region may be different from each other. Accordingly, a stress is easily concentrated to the interlayer region. Thus, a compressive strength after impact or the like of the fiber-reinforced composite material, a fracture in the interlayer region is predominant. Therefore, it is known that, the improvement of the strength of the reinforced fiber does not cause a drastic improvement of the compressive strength after impact or the like of the fiber-reinforced composite material. Particularly, in a case where a cured material of the thermosetting resin composition is set as a matrix resin, the cured material of the thermosetting resin composition has various advantages such as a cost, productivity, and heat resistance, but also has a disadvantage such as a poor toughness. Thus, the toughness of the interlayer region of the fiber-reinforced composite material is also insufficient.

As a fiber-reinforced composite material having an improved toughness of an interlayer region, for example, the followings are proposed.

(1) A fiber-reinforced composite material in which fine particles such as high-toughness polyamide or the like is disposed in an interlayer region (Patent Documents 1 and 2).

(2) A specific fiber-reinforced composite material in which fine particles having specific particle size distribution index, sphericity, and glass transition temperature are disposed in an interlayer region, and an elastomer component is included in a matrix resin (Patent Document 3).

(3) A fiber-reinforced composite material in which high-toughness polyamide fine particles are disposed in an interlayer region and a special morphology is formed, and a producing method of the same (Patent Documents 4 and 5).

In recent years, the fiber-reinforced composite material has been applied to large-sized members having a three-dimensional curved surface shape such as a constructional material of an aeroplane, a blade of a windmill, and the like. In a case where a tension or a stress of compression is loaded to the large-sized members having a three-dimensional curved surface shape, a peeling-off stress in an off-plate direction is generated in the interlayer region of the fiber-reinforced composite material. Accordingly, mode 1 interlayer fracture toughness and mode II interlayer fracture toughness for preventing the proceeding of cracks generated in the interlayer region of the fiber-reinforced composite material are important properties.

In the fiber-reinforced composite material of the section (1), an interlayer fracture toughness in a progress with the mode II interlayer fracture toughness is high. Accordingly, the compressive strength after impact is high and a damage on a member surface due to a falling weight impact is prevented. However, in the fiber-reinforced composite material of Patent Document 1, an interfacial properties between the morphology of fine particles after molding or fine particles, and the matrix resin composition are not sufficient considered, and the mode I interlayer fracture toughness and the mode II interlayer fracture toughness necessary for an increase in size of the member or a complexity such as a three-dimensional curved surface shape are not sufficient. In addition, in a prepreg or a forming method of the fiber-reinforced composite material thereof in Patent Document 2, the morphology regarding the fine particles in the fiber-reinforced composite material is controlled by a melting point or a molding temperature of the fine particles disposed in the interlayer region. Accordingly, the producing conditions are limited. In addition, the interfacial properties between the fine particles and the matrix resin are not sufficient considered, and an effect of the disposition of the fine particles is not sufficiently obtained, due to cracks generated in the interlayer region of the fiber-reinforced composite material due to the peeling-off stress in an off-plate direction proceeding on the interface between the fine particles and the matrix resin. In addition, the cracks may be transferred to the interface between the reinforced fiber and the matrix resin while the cracks proceed the interface between the fine particles and the matrix resin composition.

In the fiber-reinforced composite material of the section (2), the mode II interlayer fraction toughness effective for the improvement of the compressive strength after impact and the mode I interlayer fraction toughness necessary for an increase in size of the member or a complexity such as a three-dimensional curved surface shape are high. However, the interfacial properties between the morphology of fine particles after molding or fine particles, and the matrix resin composition are not sufficient considered, and the cracks generated in the interlayer region of the fiber-reinforced composite material due to the peeling-off stress in an off-plate direction may not stably stay in the interlayer region depending on the producing conditions of the fiber-reinforced composite material, in the same manner as in Patent Document 2. Accordingly, the effect of the disposition of the fine particles is not sufficiently obtained.

Patent Document of the section (3) discloses a method of producing a fiber-reinforced composite material having excellent mode I interlayer fracture toughness and mode II interlayer fracture toughness, by disposing high-toughness polyamide fine particles in an interlayer region and forming a special morphology. However, producing conditions such as a curing temperature or a rate in temperature increase are limited. Accordingly, in a case where the special morphology is not formed, sufficient mode I interlayer fracture toughness and mode II interlayer fracture toughness are not realized.

DOCUMENTS OF RELATED ART

Patent Documents

[Patent Document 1] Japanese Unexamined Patent Application, First Publication No. S63-162732
[Patent Document 2] Japanese Unexamined Patent Application, First Publication No. 2009-286895
[Patent Document 3] International Publication No. WO2012/102201
[Patent Document 4] Japanese Unexamined Patent Application, First Publication No. 2017-206615
[Patent Document 5] Japanese Unexamined Patent Application, First Publication No. 2016-199682

SUMMARY OF THE INVENTION

An object of the invention is to provide a prepreg and a fiber-reinforced composite material having excellent mode I interlayer fracture toughness and mode II interlayer fracture toughness which are stable regardless of producing conditions such as a curing temperature or a rate in temperature increase.

The invention has the following aspects.

[1] A prepreg including: a component (A); a component (B); and a component (C), in which the component (A) is a reinforced fiber substrate, the component (B) is an epoxy resin composition, the component (C) is a component (c1) or a component (c2), the component (c1) includes polyamide particles and thermosetting polyimide particles, and the component (c2) includes spherical polyamide particles having a melting point of 140° C. to 175° C.

[2] The prepreg according to [1], in which the component (C) is the component (c1).

[3] The prepreg according to [1] or [2], in which the component (C) is the component (c1), and a mass ratio represented by [polyamide particles]:[thermosetting polyimide particles] is 60:40 to 95:5.

[4] The prepreg according to any one of [1] to [3], in which the component (C) is the component (c1), and a melting point of the polyamide particles in the component (c1) is 140° C. to 175° C.

[5] The prepreg according to any one of [1] to [4], in which the component (C) is the component (c1), and the polyamide particles in the component (c1) is crystalline nylon copolymer particles.

[6] The prepreg according to any one of [1] to [4], in which the component (C) is the component (c1), and the polyamide particles in the component (c1) is spherical particles comprising a copolymer of nylon 12 and nylon 6.

[7] The prepreg according to [1], in which the component (C) is the component (c2).

[8] The prepreg according to [7], in which spherical polyamide particles having a melting point of 140° C. to 175° C. are crystalline nylon copolymer particles.

[9] The prepreg according to [7], in which the spherical polyamide particles having a melting point of 140° C. to 175° C. are spherical particles comprising a copolymer of nylon 12 and nylon 6.

[10] The prepreg according to any one of [1] and [7] to [9], in which the component (C) is the component (c2), and the component (c2) further includes thermosetting polyimide particles.

[11] The prepreg according to any one of [1] and [7] to [10], in which the component (C) is the component (c2), the component (c2) further includes thermosetting polyimide particles, and the thermosetting polyimide particles has a chemical structure of General Formula (1) or General Formula (2);

[Chemical Formula 1]

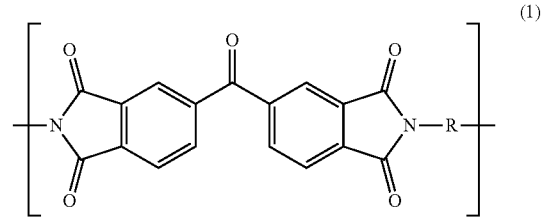

[Chemical Formula 2]

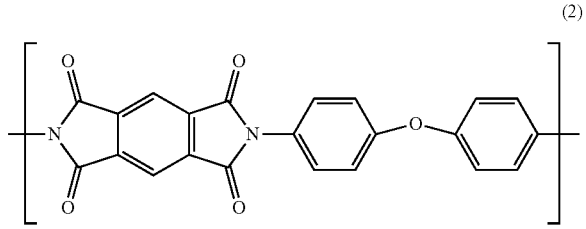

(In Formula (1), R represents a divalent linking group)

[12] The prepreg according to any one of [1] to [11], in which 70 mass % or more of the component (C) is present in a surface of the component (A).

[13] The prepreg according to any one of [1] to [12], in which the component (A) includes a reinforcing fiber, and the reinforcing fiber is a carbon fiber.

[14] The prepreg according to any one of [1] to [13], in which the component (B) includes an epoxy resin and aromatic polyamine, the epoxy resin includes an epoxy resin having a naphthalene structure, and a content of the epoxy resin having a naphthalene structure is 60 to 100 mass % with respect to a total mass of the epoxy resin.

[15] The prepreg according to any one of [1] to [14], in which a content of the component (C) is 5 to 25 parts by mass with respect to 100 parts by mass of the component (B).

[16] A fiber-reinforced composite material obtained by laminating two or more prepregs according to any one of [1]

to [15] and heating the laminated prepregs to a temperature equal to or higher than a curing temperature of the component (B).

[17] A fiber-reinforced composite material comprising: a component (A); a component (B'); and a component (C), in which the component (A) is a reinforced fiber substrate, the component (B') is a cured material of an epoxy resin composition, the component (C) is a component (c1) or a component (c2), the component (c1) includes polyamide particles and thermosetting polyimide particles, the component (c2) includes spherical polyamide particles having a melting point of 140° C. to 175° C., a plurality of the components (A) are laminated, and the component (C) is present between layers of the components (A).

[18] The prepreg according to any one of [1] to [15], in which the component (B) includes an epoxy resin, and the epoxy resin includes an epoxy resin having an oxazolidone ring structure.

[19] The prepreg according to [18], in which a percentage of the epoxy resin having an oxazolidone ring structure is 10 to 40 mass % with respect to 100 mass % of the epoxy resin in the component (B).

[20] The prepreg according to any one of [1] to [15], [18], and [19], in which the component (B) includes aromatic polyamine, and the aromatic polyamine is 4,4'-diaminodiphenyl sulfone.

[21] The prepreg according to any one of [1] to [15] and [18] to [20], in which the component (B) includes an epoxy resin, and the epoxy resin includes at least one kind of epoxy resin selected from a group consisting of a bisphenol A type epoxy resin, a bisphenol F type epoxy resin, and a tri- or more functional epoxy resin.

According to the invention, it is possible to provide a prepreg and a fiber-reinforced composite material having excellent mode I interlayer fracture toughness and mode II interlayer fracture toughness which are stable regardless of producing conditions such as a curing temperature or a rate in temperature increase.

DETAILED DESCRIPTION OF THE INVENTION

Figure 1:
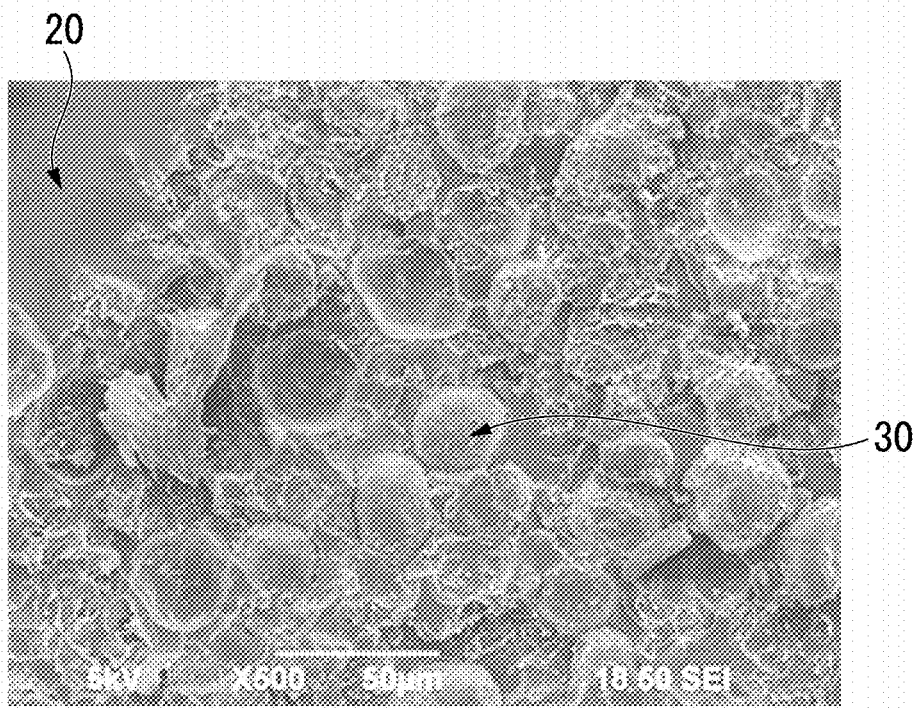
FIG. 1 is a fracture surface SEM image of a fiber-reinforced composite material in a DCB test (pattern that an interface of a component (C) is exposed).

Hereinafter, a fiber-reinforced composite material according to one embodiment of the invention and a producing method thereof will be described in detail.

A prepreg of the invention is a prepreg including a component (A), a component (B), and a component (C) shown below.
component (A): reinforced fiber substrate
component (B): epoxy resin composition
component (C): component (c1) or component (c2), the component (c1) includes polyamide particles and thermosetting polyimide particles, and the component (c2) includes spherical polyamide particles having a melting point of 140° C. to 175° C.

In addition, the fiber-reinforced composite material of the invention is a fiber-reinforced composite material including: a component (A); a cured material of a component (B'); and a component (C), in which a plurality of the component (A) are laminated, and the component (C) is present between the layers of the component (A).

Further, the fiber-reinforced composite material of the invention is a cured material of a laminate of two or more layers of the prepregs.

Definition

Terms used in the invention and the description of the invention are as follows.

A "crystalline polyamide resin" means a resin having a melting point appearing in differential scanning calorimetry (hereinafter, referred to as DSC).

An "amorphous polyamide resin" means a resin having a melting point not appearing in the DSC.

An "interlayer" means a region where a fraction of a reinforced fiber in the vicinity of a boundary between the laminated prepreg and prepreg is small, in the fiber-reinforced composite material produced by laminating the prepregs.

"Spherical particles" indicates particles having an average value of a ratio of a short diameter to a long diameter (short diameter/long diameter) of 10 particles of equal to or greater than 0.95, by measuring short diameters and long diameters of the randomly selected 10 particles using a scanning electron microscope (manufactured by JEOL Ltd., JSM-6390).

A "melting point" is a melting peak temperature of a DSC curve of a crystalline resin obtained as follows. A crystalline resin was heated from room temperature to a temperature higher than the expected melting point by approximately 30° C. at 10° C./min, and maintained at the temperature higher than the expected melting point by approximately 30° C. for 10 minutes. Then, the crystalline resin was cooled to a temperature lower than the expected melting point by approximately 50° C. at 10° C./min The crystalline resin was heated to the temperature higher than the expected melting point by approximately 30° C. at 10° C./min.

A "glass transition temperature" is a midpoint glass transition temperature obtained from DSC measurement of the amorphous resin as follows. An amorphous resin was heated from room temperature to a temperature higher than the expected glass transition temperature by approximately 30° C. at 10° C./min, and maintained at the temperature higher than the expected glass transition temperature by approximately 30° C. for 10 minutes. The amorphous resin cooled to the temperature lower than the expected glass transition temperature by approximately 50° C. was heated to the temperature higher than the expected glass transition temperature by approximately 30° C. at 20° C./min. In a transition portion of a base line according to the glass transition temperature of the obtained DSC curve, a point where a linear line which is at regular distance in a longitudinal axial direction from a linear line extended from the base line on a low temperature side and a linear line extended from the base line on a high temperature side, and a curved line of the transition portion of the base line intersect, was set as the glass transition temperature.

An "average particle diameter" means a particle diameter (D50) at cumulative frequency of 50% in a cumulative distribution based on volume obtained by a particle diameter distribution measurement.

An "epoxy resin" means a compound having two or more epoxy groups in a molecule.

An "interlayer fracture toughness" means a threshold value of energy necessary for generating interlayer peeling-off cracks per unit volume.

"GIC" means a mode I interlayer fracture toughness value in a crack development initial stage.

"GIIC" means a mode II interlayer fracture toughness value in a crack development initial stage.

A "mode I" means an (opening type) modification mode in which a direction of crack opening displacement is perpendicular to various crack surfaces.

A "mode II" means an (longitudinal shear type) modification mode in which a direction of crack opening displacement is parallel to a crack surface and perpendicular to a crack front edge.

The "crack opening displacement" is a relative displacement of crack upper and lower surfaces.

Fiber-Reinforced Composite Material

The fiber-reinforced composite material according to one embodiment of the invention is a fiber-reinforced composite material obtained by laminating two or more prepregs satisfying specific conditions and curing.

Prepreg

The prepreg includes the component (A), the component (B), and the component (C).

(Component (A))

The component (A) is a reinforced fiber substrate and preferably has a sheet shape. In the reinforced fiber substrate, a reinforced fiber may be aligned in a single direction or may be aligned in random directions.

As the aspect of the component (A), a fabric of a reinforced fiber, an unwoven fabric, and a sheet in which long filaments of the reinforced fiber are aligned in one direction are used.

From a viewpoint of molding the fiber-reinforced composite material having a high specific strength or a specific modulus, the component (A) is preferably a sheet comprising a bunch of reinforced fibers in which long filaments are aligned in a single direction, and from a viewpoint of easy handling, the component (A) is preferably a fabric of the reinforced fiber.

The reinforced fiber may be long filaments and the long filaments may have a strand shape. In addition, the reinforced fiber may be ground (milled) and may have cut (chopped) long filaments or the strand thereof.

Examples of the reinforcing fiber include a glass fiber, a carbon fiber (including graphite fiber), an aramid fiber, and a boron fiber. The reinforcing fiber substrate is preferably a carbon fiber substrate, from viewpoints of mechanical physical properties and light weight of the fiber-reinforced composite material.

A tensile strength of the carbon fiber based on ASTM D4018 is preferably equal to or greater than 3,500 MPa, more preferably equal to or greater than 5,000 MPa, even more preferably equal to or greater than 6,000 MPa. A modulus of elasticity is preferably equal to or greater than 150 GPa, more preferably equal to or greater than 200 GPa, and even more preferably equal to or greater than 250 GPa.

For example, in a case of using the fiber-reinforced composite material according to one embodiment as a constructional material of an aeroplane, the carbon fiber used in the fiber-reinforced composite material is preferably a carbon fiber having a high strand strength, and the strand strength of the carbon fiber based on ASTM D4018 is preferably equal to or greater than 6,000 MPa.

A fiber diameter of the carbon fiber is preferably equal to or greater than 3 μm and preferably equal to or smaller than 12 μm. In a case where the fiber diameter of the carbon fiber is equal to or greater than 3 μm, carbon fibers are hardly rubbed each other by traverse movement of carbon fibers, carbon fibers are hardly cut, or fluff is hardly generated, in a process for processing the carbon fiber, for example, combing or rolling. Accordingly, it is possible to suitably produce a fiber-reinforced composite material having a stable strength. In addition, in a case where the fiber diameter of the carbon fiber is equal to or smaller than 12 μm, it is possible to produce a carbon fiber by a typical method. That is, the fiber diameter of the carbon fiber is preferably 3 to 12 μm.

The number of carbon fibers in the bunch of carbon fibers is preferably 1,000 to 70,000.

(Component (B))

The component (B) is an epoxy resin composition.

The component (B) preferably includes an epoxy resin and a curing agent of the epoxy resin. The component (B) may include other components, in addition to the epoxy resin and the curing agent, if necessary.

Epoxy resin:

As the epoxy resin, normally, a bi- or more functional epoxy resin including two or more epoxy groups in a molecule is used. As the epoxy resin, an epoxy resin having an oxazolidone ring structure is preferable, from a viewpoint of improving a toughness, while maintaining heat resistance and rigidity of a cured material of the component (B).

As the epoxy resin, any one or both of a bisphenol A type epoxy resin in a liquid state at 25° C. and a bisphenol F type epoxy resin in a liquid state at 25° C. are preferable, from viewpoints of realizing a comparatively low viscosity and not negatively affecting properties such as heat resistance and toughness of the cured material of the component (B).

As the epoxy resin, any one or both of a bisphenol A type epoxy resin in a solid state at 25° C. and a bisphenol F type epoxy resin in a solid state at 25° C. are preferable, from a viewpoint of applying a toughness to the cured material of the component (B).

As the epoxy resin, a tri- or more functional epoxy resin including three or more epoxy groups in a molecule is preferable, from a viewpoint of improving heat resistance of the cured material of the component (B).

Epoxy Resin Having Oxazolidone Ring Structure:

The epoxy resin having an oxazolidone ring structure is also referred to as a urethane-modified epoxy resin or an isocyanate-modified epoxy resin. Examples of a commercially available product of the epoxy resin having an oxazolidone ring structure include EPICLON (registered trademark) TSR-400 manufactured by DIC Corporation, EPOTOHTO (registered trademark) YD-952 manufactured by Nippon Steel & Sumikin Chemical Co. Ltd., D.E.R. (registered trademark) 858 manufactured by DOW Chemical Company, and LSA 3301 manufactured by ASAHI KASEI E-materials Corporation.

A percentage of the epoxy resin having an oxazolidone ring structure is preferably 5 to 70 mass % and more preferably 10 to 60 mass % with respect to 100 mass % of the entire epoxy resin in the component (B). In a case where the percentage of the epoxy resin having an oxazolidone ring structure is equal to or greater than the lower limit value of the range described above, it is possible to sufficiently improve the toughness, while sufficiently maintaining heat resistance and rigidity of the cured material of the component (B). In a case where the percentage of the epoxy resin having an oxazolidone ring structure is equal to or smaller than the upper limit value of the range described above, the viscosity of the component (B) is not excessively high. Accordingly, handling ability of the component (B) is excellent, the component (B) is easily used in the producing of the prepreg, and a tackiness and drape properties of the prepreg are improved.

Bisphenol A Type Epoxy Resin And Bisphenol F Type Epoxy Resin:

In a case of using the solid epoxy resin having an oxazolidone ring structure, the viscosity of the component (B) increases. Accordingly, any one or both of a bisphenol A type epoxy resin in a liquid state at 25° C. and a bisphenol F type epoxy resin in a liquid state at 25° C. are preferably used in combination.

The bisphenol F type epoxy resin in a liquid state at 25° C. has heat resistance which is slightly deteriorated than that of the bisphenol A type epoxy resin in a liquid state at 25° C., but it is preferable, because it has a lower viscosity than that of the liquid bisphenol A type epoxy resin and a comparatively high modulus of elasticity can be applied to the cured material of the component (B).

Examples of a commercially available product of the bisphenol A type epoxy resin in a liquid state at 25° C. include jER (registered trademark) 828 manufactured by Mitsubishi Chemical Corporation, D.E.R. (registered trademark) 331 manufactured by DOW Chemical Company, EPOTOHTO (registered trademark) YD-128 manufactured by Nippon Steel & Sumikin Chemical Co. Ltd., and EPICLON (registered trademark) 850 manufactured by DIC Corporation.

Examples of a commercially available product of the bisphenol F type epoxy resin in a liquid state at 25° C. include jER (registered trademark) 807 manufactured by Mitsubishi Chemical Corporation, D.E.R. (registered trademark) 354 manufactured by DOW Chemical Company, EPOTOHTO (registered trademark) YD-170 manufactured by Nippon Steel & Sumikin Chemical Co. Ltd., and EPICLON (registered trademark) 830 manufactured by D1C Corporation.

A total percentage of the bisphenol A type epoxy resin in a liquid state at 25° C. and the bisphenol F type epoxy resin in a liquid state at 25° C. is preferably 10 to 80 mass % and more preferably 20 to 60 mass % with respect to 100 mass % of the entire epoxy resin in the component (B). In a case where the total percentage of the bisphenol A type epoxy resin in a liquid state at 25° C. and the bisphenol F type epoxy resin in a liquid state at 25° C. is equal to or greater than the lower limit value of the range described above, the component (B) can have a suitable viscosity, and handling ability of the component (B) can be improved or the component (B) can be easily immersed in the component (A). In a case where the total percentage of the bisphenol A type epoxy resin in a liquid state at 25° C. and the bisphenol F type epoxy resin in a liquid state at 25° C. is equal to or smaller than the upper limit value of the range described above, it is possible to prevent an excessive decrease in viscosity of the component (B), to prevent leakage of a large amount of the component (B) out of a system, in a case of heating and curing a prepreg produced by immersing the component (B) in the component (A), and prevent a possibility of negatively affecting a shape or mechanical properties of the fiber-reinforced composite material.

The bisphenol A type epoxy resin in a solid state at 25° C. and the bisphenol F type epoxy resin in a solid state at 25° C. have heat resistance which is slightly deteriorated than those of the bisphenol A type epoxy resin in a liquid state at 25° C. and the bisphenol F type epoxy resin in a liquid state at 25° C., but the viscosity of the component (B) can be adjusted or a toughness can be applied to the cured material of the component (B).

The bisphenol F type epoxy resin in a solid state at 25° C. has heat resistance which is slightly deteriorated than that of the bisphenol A type epoxy resin in a solid state at 25° C., but it is preferable, from a viewpoint of applying a comparatively high modulus of elasticity to the cured material of the component (B).

Examples of a commercially available product of the bisphenol A type epoxy resin in a solid state at 25° C. include jER (registered trademark) 1001, jER (registered trademark) 1002, jER (registered trademark) 1003, jER (registered trademark) 1004 manufactured by Mitsubishi Chemical Corporation, EPOTOHTO (registered trademark) YD-903 manufactured by Nippon Steel & Sumikin Chemical Co. Ltd., and EPICLON (registered trademark) 1050, EPICLON (registered trademark) 2050, EPICLON (registered trademark) 3050, EPICLON (registered trademark) 4050 manufactured by DIC Corporation.

Examples of a commercially available product of the bisphenol F type epoxy resin in a solid state at 25° C. include jER (registered trademark) 4004P, jER (registered trademark) 4005P, jER (registered trademark) 4007P, jER (registered trademark) 4010P manufactured by Mitsubishi Chemical Corporation, EPOTOHTO (registered trademark) YD-2001 and EPOTOHTO (registered trademark) YD-2004 manufactured by Nippon Steel & Sumikin Chemical Co. Ltd.

A total percentage of the bisphenol A type epoxy resin in a solid state at 25° C. and the bisphenol F type epoxy resin in a solid state at 25° C. is preferably 1 to 60 mass % and more preferably 5 to 40 mass %, with respect to 100 mass % of the entire epoxy resin in the component (B). In a case where the total percentage of the bisphenol A type epoxy resin in a solid state at 25° C. and the bisphenol F type epoxy resin in a solid state at 25° C. is equal to or greater than the lower limit value of the range described above, a toughness can be sufficiently applied to the cured material of the component (B). In a case where the total percentage of the bisphenol A type epoxy resin in a solid state at 25° C. and the bisphenol F type epoxy resin in a solid state at 25° C. is equal to or smaller than the upper limit value of the range described above, it is possible to prevent an excessive increase in viscosity of the component (B) and to prevent a deterioration of handling ability of the component (B) and difficulty of immersing in the component (A).

Tri- or More Functional Epoxy Resin:

Examples of the tri- or more functional epoxy resin include a triazine structure-containing epoxy resin, an aminophenol type epoxy resin, and an amino cresol type epoxy resin.

Examples of a tetra- or more functional epoxy resin include a diaminodiphenyl methane epoxy resin, a cresol novolac epoxy resin, a phenol novolac epoxy resin, and an aromatic glycidyl amine epoxy resin.

A percentage of the tri- or more functional epoxy resin is preferably smaller than 50 mass % and more preferably 5 to 40 mass %, with respect to 100 mass % of the entire epoxy resin in the component (B). In a case where the percentage of the tri- or more functional epoxy resin is in the range described above, a reactivity of the component (B) can be in a suitable range, and heat resistance of a cured matrix resin composition can also be improved. In a case where the reactivity of the component (B) is in a suitable range, it is possible to prevent an excessive weak bonding of the component (C) which will be described later, particularly, the interface between the component (C) and the component (B), and to sufficiently realize the effect of applying an excellent interlayer fracture toughness to the fiber-reinforced composite material due to the component (C) blending. In addition, in a case where the percentage of the tri- or more functional epoxy resin is in the range described above, it is possible to prevent an excessive increase in a crosslinking density of the cured material of the component (B) and to also prevent a significant decrease in toughness of the cured material of the component (B).

Examples of a commercially available product of the tri- or more functional epoxy resin include jER (registered trademark) 630 manufactured by Mitsubishi Chemical Corporation, Araldite (registered trademark) MY0500, MY0510, MY0600, and MY0610 manufactured by Huntsman Corporation, and TEPIC (registered trademark) -G, -S, -SP, and -VL manufactured by Nissan Chemical Corporation. Examples of the commercially available product of the tetra- or more functional epoxy resin include jER (registered trademark) 604, 152, 154 manufactured by Mitsubishi Chemical Corporation, Araldite (registered trademark) MY720 manufactured by Huntsman Corporation, YH434L, YDPN-638, YDCN-700-7 manufactured by Nippon Steel & Sumikin Chemical Co. Ltd., and EPICLON (registered trademark) N-740, N-770, N-775 manufactured by DIC Corporation.

Among these, jER (registered trademark) 630 manufactured by Mitsubishi Chemical Corporation and Araldite (registered trademark) MY0500, MY0510, MY0600, and MY0610 manufactured by Huntsman Corporation which are aminophenol type epoxy resins, or jER (registered trademark) 604 manufactured by Mitsubishi Chemical Corporation, Araldite (registered trademark) MY720 manufactured by Huntsman Corporation, and YH434L manufactured by Nippon Steel & Sumikin Chemical Co. Ltd. which are diaminodiphenyl methane epoxy resins are preferable, from viewpoints of greatly increasing the viscosity of the matrix resin composition by blending and increasing heat resistance or modulus of elasticity of the cured matrix resin, and the diaminodiphenyl methane epoxy resins are more preferable, from a viewpoint of not excessively increasing a coefficient of water absorption of the cured matrix resin, in addition to the points described above.

Other Epoxy Resins:

The component (B) may include other epoxy resins such as bisphenol S type, naphthalene type, dicyclopentadiene type, resorcinol type, hydroquinone type, bisphenoxyethanol fluorene type, bisphenol fluorene type, biscresol fluorene type epoxy resins.

Curing Agent:

The curing agent may be obtained by curing the epoxy resin.

Examples of the curing agent include amine, acid anhydride (carboxylic acid anhydride), phenol (novolak resin or the like), mercaptan, a Lewis acid amine complex, onium salt, and imidazole. As the epoxy resin curing agent, aromatic polyamine is preferable and diaminodiphenyl sulfone is more preferable, from viewpoints of excellent heat resistance and toughness of the cured material of the component (B).

An added amount of the curing agent is different depending on the kind of the curing agent. In a case where the curing is diaminodiphenyl sulfone, the added amount of diaminodiphenyl sulfone is preferably an amount that an active hydrogen equivalent number of diaminodiphenyl sulfone is 0.9 to 1.5 times and more preferably an amount that the active hydrogen equivalent number thereof becomes 1.1 to 1.3 times, with respect to 1 equivalent of the epoxy group of the epoxy resin. In a case where the added amount of diaminodiphenyl sulfone is in the range described above, the heat resistance and the toughness of the cured material of the component (B) are more excellent.

With 3,3'-diaminodiphenyl sulfone, a high-elasticity cured material can be obtained, compared to a case using 4,4'-diaminodiphenyl sulfone, but the heat resistance of the cured material may be deteriorated, bonding of the component (C) which will be described later, particularly, the interface between the component (C) and the component (B) may be weakened, or the interlayer fracture toughness of the fiber-reinforced composite material may be deteriorated. With 4,4'-diaminodiphenyl sulfone, elasticity of the obtained cured material is deteriorated, compared to a case using 3,3'-diaminodiphenyl sulfone, but the heat resistance of the cured material is excellent, the bonding of the component (C) which will be described later, particularly, the interface between the component (C) and the component (B) is hardly weakened, and a higher interlayer fracture toughness of the fiber-reinforced composite material can be realized. Therefore, for the use that requires compression properties of the fiber-reinforced composite material, 3,3'-diaminodiphenyl sulfone is more preferable, and for the use that requires heat resistance or interlayer fracture toughness of the fiber-reinforced composite material, 4,4'-diaminodiphenyl sulfone is more preferable. In addition, 3,3'-diaminodiphenyl sulfone and 4,4'-diaminodiphenyl sulfone can also be used together depending on the use.

Other Components:

As the other components included in the component (B), well-known various additives are used.

Examples of the additive include a thermoplastic elasltomer, elastomer fine particles (excluding the component (C)), core-shell type elastomer fine particles, a block copolymer configured of an acrylic resin, a compound including one epoxy group in a molecule, a diluent, inorganic particles (silica or the like), a carbon material component (carbon nanotubes or the like), a flame retardant (phosphorus compound or the like), and a defoaming agent. As the additive, core-shell type elastomer fine particles or a block copolymer configured of an acrylic resin is preferable, from a viewpoint of improving the toughness without deteriorating the heat resistance of the cured material of the component (B).

Examples of a commercially available product of the core-shell type elastomer fine particles include METABLEN (registered trademark) manufactured by Mitsubishi Chemical Corporation, STAPHYROID (registered trademark) manufactured by Aica Kogyo Co., Ltd., and PARALOID (registered trademark) manufactured by DOW Chemical Company.

The core-shell type elastomer fine particles may be dispersed in the epoxy resin in advance. Examples of a commercially available product of the core-shell type elastomer fine particles-dispersed epoxy resin include KANEACE (registered trademark) manufactured by KANEKA CORPORATION, and acryset (registered trademark) BP series manufactured by NIPPON SHOKUBAI CO., LTD. The core-shell type elastomer fine particles-dispersed epoxy resin is preferably used, from a viewpoint of not only easily performing the producing of the component (B), but also improving a dispersed state of the core-shell type elastomer fine particles in the component (B).

Examples of the block copolymer configured of an acrylic resin include Nanostrength (registered trademark) series manufactured by Arkema, for example, Nanostrength (registered trademark) M52N, Nanostrength (registered trademark) M22N.

As the component (B), an epoxy resin composition which includes an epoxy resin, 60 to 100 mass % of which is an epoxy resin having a naphthalene structure with respect to 100 mass % of the epoxy resin, and further includes aromatic polyamine as a curing agent, is also used. This component (B) may include other components, in addition to the epoxy resin and the curing agent, if necessary. Hereinafter, a case where the component (B) is the epoxy resin composition which includes an epoxy resin, 60 to 100 mass % of which is an epoxy resin having a naphthalene structure with respect to 100 mass % of the epoxy resin, and further includes aromatic polyamine as a curing agent, will be described.

Epoxy Resin Having Naphthalene Structure:

The epoxy resin is generally a di- or more functional epoxy resin including two or more epoxy groups in a molecule, and the epoxy resin having a naphthalene structure is a di- or more functional epoxy resin having a naphthalene ring and including two or more epoxy groups in a molecule. The epoxy resin having a naphthalene structure can apply excellent heat resistance to the cured material, due to the rigid structure thereof, compared to a case of the typical bisphenol A type epoxy resin or the bisphenol F type epoxy resin.

Difunctional Epoxy Resin Having Naphthalene Structure:

The difunctional epoxy resin having a naphthalene structure is a difunctional epoxy resin having a naphthalene ring and including two epoxy groups in a molecule. The difunctional epoxy resin having a naphthalene structure can apply excellent heat resistance to the matrix resin after curing, due to the rigid structure thereof, as described above. Generally, unlike a polyfunctional epoxy resin used for applying the heat resistance of the cured material, the difunctional epoxy resin having a naphthalene structure does not increase a crosslinking density of the cured material. Thus, it is possible to prevent a deterioration in toughness of the matrix resin after curing, a deterioration of stickiness between the reinforced fiber and the matrix resin, and difficulty of sufficiently obtaining the effect of the disposition of the fine particles described above. In addition, in a case of using a large amount of the polyfunctional epoxy, the amount of water absorption of the matrix resin after curing tends to increase, but in a case of the difunctional epoxy resin having a naphthalene structure, it is also possible to prevent an increase in amount of water absorption of the matrix resin after curing. Examples of a commercially available product of the difunctional epoxy resin having a naphthalene structure include EPICLON (registered trademark) HP-4032D and HP-4032SS manufactured by DIC Corporation.

A percentage of the difunctional epoxy resin having a naphthalene structure is preferably 50 to 100 mass %, more preferably 55 to 90 mass %, even more preferably 60 to 85 mass %, with respect to 100 mass % of the entire epoxy resin in the component (B).

In a case where the percentage of the difunctional epoxy resin having a naphthalene structure is equal to or greater than the lower limit value of the range described above, it is possible to sufficiently improve the heat resistance of the cured material, while maintaining the toughness of the cured material of the component (B), and the stickiness of the interface between the reinforced fiber and the matrix resin. In addition, the difunctional epoxy resin having a naphthalene structure is normally liquid. Accordingly, by using with a thermoplastic resin which can be soluble in an epoxy resin such as solid epoxy resin or polyether sulfone, the handling ability of the component (B) is improved, the producing of the prepreg becomes easier, or the tackiness and drape properties of the prepreg are improved.

Tri- or Tetra-Functional Epoxy Resin Having Naphthalene Structure:

A tri- or tetra-functional epoxy resin having a naphthalene structure is a tri- or tetra-functional epoxy resin having a naphthalene structure and including three or four epoxy groups in a molecule. The tri- or tetra-functional epoxy resin having a naphthalene structure can apply excellent heat resistance to the matrix resin after curing, due to the rigid structure thereof, and also, by increasing a crosslinking density of the cured material, excellent heat resistance can be applied to the matrix resin after curing. Examples of a commercially available product of the tri- or tetra-functional epoxy resin having a naphthalene structure include EPICLON (registered trademark) HP-4700, HP-4710, HP-4770 manufactured by DIC Corporation, and NC-7000L and NC-7300L manufactured by Nippon Kayaku Co., Ltd.

A percentage of the tri- or tetra-functional epoxy resin having a naphthalene structure is preferably 5 to 50 mass %, more preferably 10 to 40 mass %, and even more preferably 15 to 35 mass %, with respect to 100 mass % of the entire epoxy resin in the component (B). In a case where the percentage of the tri- or tetra-functional epoxy resin having a naphthalene structure is equal to or greater than the lower limit value of the range described above, it is possible to sufficiently improve the heat resistance of the cured material of the component (B). On the other hand, in a case where the percentage thereof is equal to or smaller than the upper limit value, it is possible to sufficiently maintain the toughness of the cured material of the component (B), the stickiness of the interface between the reinforced fiber and the matrix resin, and the amount of water absorption, and the viscosity of the component (B) does not excessively increase. Accordingly, the handling ability of the component (B) is improved, the producing of the prepreg becomes easier, and the tackiness and drape properties of the prepreg are improved.

Other Epoxy Resins:

The component (B) may include other epoxy resins such as an epoxy resin having an oxazolidone ring structure, a bisphenol A type epoxy resin, a bisphenol F type epoxy resin, a bisphenol S type epoxy resin, a triazine structure-containing epoxy resin, an aminophenol type epoxy resin, an amino cresol type epoxy resin, a cresol novolac type epoxy resin, a phenol novolac type epoxy resin, an aromatic glycidyl amine type epoxy resin, and dicyclopentadiene type, resorcinol type, hydroquinone type, bisphenoxyethanol fluorene type, bisphenol fluorene type, and biscresol fluorene type epoxy resins, if necessary, in addition to the epoxy resin having a naphthalene structure.

A percentage of the epoxy resin having an oxazolidone ring structure is preferably 10 to 40 mass %, more preferably 10 to 35 mass %, and even more preferably 15 to 30 mass %, with respect to 100 mass % of the entire epoxy resin in the component (B). In a case where the percentage of the epoxy resin having an oxazolidone ring structure is equal to or greater than the lower limit value of the range described above, it is possible to improve the toughness or the stickiness of the interface between the reinforced fiber and the matrix resin, while sufficiently maintaining the heat resistance and rigidity of the cured material of the component (B). In a case where the percentage of the epoxy resin having an oxazolidone ring structure is equal to or smaller than the upper limit value of the range described above, the viscosity of the component (B) does not excessively increase. Accordingly, the handling ability of the component (B) is improved, the producing of the prepreg becomes easier, and the tackiness and drape properties of the prepreg are improved.

From viewpoints of realizing a comparatively low viscosity and not negatively affecting properties such as heat resistance or toughness of the cured material of the component (B), the bisphenol A type epoxy resin in a liquid state at 25° C. and the bisphenol F type epoxy resin in a liquid state at 25° C. can be used effectively for adjusting the viscosity of the component (B). Examples of a commercially available product of the bisphenol A type epoxy resin in a liquid state at 25° C. include jER (registered trademark) 828 manufactured by Mitsubishi Chemical Corporation, D.E.R. (registered trademark) 331 manufactured by DOW Chemical Company, EPOTOHTO (registered trademark) YD-128 manufactured by Nippon Steel & Sumikin Chemical Co. Ltd., and EPICLON (registered trademark) 850 manufactured by DIC Corporation. Examples of a commercially available product of the bisphenol F type epoxy resin in a liquid state at 25° C. include jER (registered trademark) 807 manufactured by Mitsubishi Chemical Corporation, D.E.R. (registered trademark) 354 manufactured by DOW Chemical Company, EPOTOHTO (registered trademark) YD-170 manufactured by Nippon Steel & Sumikin Chemical Co. Ltd., and EPICLON (registered trademark) 830 manufactured by DIC Corporation.

The bisphenol A type epoxy resin in a solid state at 25° C. and the bisphenol F type epoxy resin in a solid state at 25° C. have heat resistance which is slightly deteriorated than those of the bisphenol A type epoxy resin in a liquid state at 25° C. and the bisphenol F type epoxy resin in a liquid state at 25° C., but the viscosity of the component (B) can be adjusted or a toughness can be applied to the cured material of the component (B).

Examples of a commercially available product of the bisphenol A type epoxy resin in a solid state at 25° C. include jER (registered trademark) 1001, jER (registered trademark) 1002, jER (registered trademark) 1003, jER (registered trademark) 1004 manufactured by Mitsubishi Chemical Corporation, EPOTOHTO (registered trademark) YD-903 manufactured by Nippon Steel & Sumikin Chemical Co. Ltd., and EPICLON (registered trademark) 1050, EPICLON (registered trademark) 2050, EPICLON (registered trademark) 3050, EPICLON (registered trademark) 4050 manufactured by DIC Corporation.

The bisphenol F type epoxy resin in a solid state at 25° C. has heat resistance which is slightly deteriorated than that of the bisphenol A type epoxy resin in a solid state at 25° C., but it is preferable, from a viewpoint of applying a comparatively high modulus of elasticity to the cured material of the component (B). Examples of a commercially available product of the bisphenol F type epoxy resin in a solid state at 25° C. include jER (registered trademark) 4004P, jER (registered trademark) 4005P, jER (registered trademark) 4007P, jER (registered trademark) 4010P manufactured by Mitsubishi Chemical Corporation, EPOTOHTO (registered trademark) YD-2001 and EPOTOHTO (registered trademark) YD-2004 manufactured by Nippon Steel & Sumikin Chemical Co. Ltd.

In order to even further improving the heat resistance of the cured material of the component (B), a polyfunctional epoxy resin such as a triazine structure-containing epoxy resin, an aminophenol type epoxy resin, an amino cresol type epoxy resin, a cresol novolac epoxy resin, a phenol novolac epoxy resin, or an aromatic glycidyl amine epoxy resin may be included.

Aromatic Polyamine:

The component (B) preferably includes aromatic polyamine as the curing agent. By using the aromatic polyamine as the curing agent, it is possible to obtain the cured material having excellent heat resistance.

As the aromatic polyamine, diaminodiphenyl methane, diaminodiphenyl sulfone, metaxylene diamine, metaphenylene diamine, a derivative of an alkyl substituent of these, or an isomer may be used, as the curing agent. Among these, diaminodiphenyl sulfone is preferable, from a viewpoint of applying excellent heat resistance and toughness to the cured material of the component (B).

An added amount of the curing agent is different depending on the kind of the curing agent. In a case where the curing is diaminodiphenyl sulfone, the added amount of diaminodiphenyl sulfone is preferably an amount that an active hydrogen equivalent number of diaminodiphenyl sulfone is 0.9 to 1.5 times, more preferably an amount that the active hydrogen equivalent number thereof becomes 1.05 to 1.4 times, and even more preferably an amount that the active hydrogen equivalent number thereof becomes 1.1 to 1.3 times, with respect to 1 equivalent of the epoxy group of the epoxy resin. In a case where the added amount of diaminodiphenyl sulfone is in the range described above, the heat resistance and the toughness of the cured material of the component (B) are more excellent.

With 3,3'-diaminodiphenyl sulfone, a high-elasticity cured material can be obtained, compared to a case using 4,4'-diaminodiphenyl sulfone, but the heat resistance of the cured material may be deteriorated, bonding of the component (C) which will be described later, particularly, the interface between the component (C) and the component (B) may be weakened, or the interlayer fracture toughness of the fiber-reinforced composite material may be deteriorated. With 4,4'-diaminodiphenyl sulfone, elasticity of the obtained cured material is deteriorated, compared to a case using 3,3'-diaminodiphenyl sulfone, but the heat resistance of the cured material is excellent, the bonding of the component (C) which will be described later, particularly, the interface between the component (C) and the component (B) is hardly weakened, and a higher interlayer fracture toughness of the fiber-reinforced composite material can be realized. Therefore, for the use that requires compression properties of the fiber-reinforced composite material, 3,3'-diaminodiphenyl sulfone is more preferable, and for the use that requires heat resistance or interlayer fracture toughness of the fiber-reinforced composite material, 4,4'-diaminodiphenyl sulfone is more preferable. In addition, 3,3'-diaminodiphenyl sulfone and 4,4'-diaminodiphenyl sulfone can also be used together depending on the use. Examples of a commercially available product of 3,3'-diaminodiphenyl sulfone include 3,3'-DAS manufactured by MITSUI FINE CHEMICALS, Inc., and examples of a commercially available product of 4,4'-diaminodiphenyl sulfone include SEIKACURE S manufactured by SEIKA CORPORATION.

Other Components:

As the other components included in the component (B), well-known various additives are used.

Examples of the additive include a thermoplastic resin which is soluble in an epoxy resin such as polyether sulfone, elastomer fine particles (excluding the component (C)), core-shell type elastomer fine particles, a block copolymer configured of an acrylic resin, a compound including one epoxy group in a molecule, a diluent, inorganic particles (silica or the like), a carbon material component (carbon nanotubes or the like), a flame retardant (phosphorus compound or the like), and a defoaming agent. As the additive, core-shell type elastomer fine particles or a block copolymer configured of an acrylic resin is preferable, from a viewpoint of improving the toughness without deteriorating the heat resistance of the cured material of the component (B).

Examples of a commercially available product of the core-shell type elastomer fine particles include METABLEN (registered trademark) manufactured by Mitsubishi Chemical Corporation, STAPHYROID (registered trademark) manufactured by Aica Kogyo Co., Ltd., and PARALOID (registered trademark) manufactured by DOW Chemical Company.

The core-shell type elastomer fine particles may be dispersed in the epoxy resin in advance. Examples of a commercially available product of the core-shell type elastomer fine particles-dispersed epoxy resin include KANEACE (registered trademark) manufactured by KANEKA CORPORATION, and acryset (registered trademark) BP series manufactured by NIPPON SHOKUBAI CO., LTD. The core-shell type elastomer fine particles-dispersed epoxy resin is preferably used, from a viewpoint of not only easily performing the producing of the component (B), but also improving a dispersed state of the core-shell type elastomer fine particles in the component (B).

Examples of the block copolymer configured of an acrylic resin include Nanostrength (registered trademark) series manufactured by Arkema, for example, Nanostrength (registered trademark) M52N, Nanostrength (registered trademark) M22N.

Producing Method of Component (B):

The component (B) can be produced by various well-known methods. As the producing method of the component (B), a method of heating and kneading each component in a planetary mixer or a kneader is used, for example.

In a case of using a particulate curing agent such as diaminodiphenyl sulfone as the curing agent, the particulate curing agent may be aggregated to cause poor dispersion. Accordingly, it is preferable to preliminarily knead the particulate curing agent in a liquid epoxy resin to obtain a masterbatch. In the preliminary kneading, a kneading device such as a triple roll mill or a ball mill is preferably used. By obtaining a masterbatch of the particulate curing agent in advance, unevenness of physical properties or poor curing of the cured material of the component (B) due to the poor dispersion, and poor immersion of the component (B) in the component (A) are prevented.

(Component (C))

The component (C) is a component (c1) or a component (c2), the component (c1) includes polyamide particles and thermosetting polyimide particles, and the component (c2) includes spherical polyamide particles having a melting point of 140° C. to 175° C.

(Polyamide Particles and Thermosetting Polyimide Particles of component (c1))

(Polyamide Particles of component (c1))

The polyamide particles of the component (c1) apply excellent interlayer fracture toughness to the fiber-reinforced composite material. A polyamide resin configuring the polyamide particles of the component (c1) is not particularly limited, as long as it has an amide bond in a repeating structure. The polyamide resin may be polyamide resin particles comprising one kind of polyamide resin or polyamide resin particles comprising two or more kinds of polyamide resin. In a case of the polyamide resin particles comprising two or more kinds of polyamide resin, each polyamide resin may be evenly present in the particles or unevenly present as in a case of a layered structure. The polyamide resin can be obtained, for example, by a method of ring-opening polymerization of lactams, condensation polymerization of diamine and dicarboxylic acid, or condensation polymerization of amino carboxylic acid. Specific examples of the polyamide resin include polyamide resins having an aromatic ring or an alicyclic ring such as nylon 6, nylon 46, nylon 66, nylon 11, nylon 12, nylon 610, nylon 612, nylon 6T, nylon 6I, nylon 9T, nylon M5T, and TROGAMID (registered trademark) T5000 and TROGAMID (registered trademark) CX7323 manufactured by Daicel-Evonik Ltd.

Any of a crystalline polyamide resin and an amorphous polyamide resin can be preferably used, and the crystalline polyamide resin and the amorphous polyamide resin may be used alone or as a mixture.

As the polyamide particles of component (c1), a crystalline nylon copolymer particles are preferable, and spherical particles comprising a copolymer of nylon 12 and nylon 6 are more preferable.

Examples of a commercially available product of the polyamide resin include VESTOSINT series (VESTOSINT (registered trademark) 2158, VESTOSINT (registered trademark) 2159, and the like) manufactured by Daicel-Evonik Ltd., GRILAMID (registered trademark) TR90NZ, GRILAMID (registered trademark) TR55 manufactured by EMS-CHEMIE (Japan) Ltd., and TROGAMID (registered trademark) CX7323 and TROGAMID (registered trademark) T5000 manufactured by Daicel-Evonik Ltd.

A melting point of the polyamide particles is preferably 140° C. to 175° C., and more preferably 155° C. to 170° C.

In a case where the melting point of the polyamide particles is in the range described above, it is possible to sufficiently strengthen the interface between the matrix resin and the polyamide particles in a process of curing the prepreg, and obtain a fiber-reinforced composite material having a high layer fracture toughness.

(Average Particle Diameter of Polyamide Particles of Component (c1))

An average particle diameter of the polyamide particles of the component (c1) is preferably 2 to 50 μm and more preferably 5 to 35 μm. In a case where the average particle diameter of the polyamide particles is equal to or greater than the lower limit value of the range described above, the polyamide particles hardly permeates the component (A), during the producing of the prepreg. Accordingly, a prepreg satisfying a condition in which 70 mass % or more of the entire component (C) is present on a surface of the component (A) which will be described later is easily obtained, thereby applying more excellent layer fracture toughness to the fiber-reinforced composite material. The component (C) present on the surface can be determined using an uneven distribution rate which will be described later. In addition, it is possible to prevent an increase in viscosity, in a case where the component (B) and the component (C) are mixed with each other. In a case where the average particle diameter of the polyamide particles is equal to or smaller than the upper limit value of the range described above, it is possible to prevent a deterioration in straightness of the reinforced fiber of the component (A) due to the component (C) in the fiber-reinforced composite material. Accordingly, it is possible to prevent a deterioration in mechanical properties of the fiber-reinforced composite material, and keep cracks generated in the interlayer region of the fiber-reinforced composite material due to the peeling-off stress in an off-plate direction, in the interlayer region. In addition, in the producing of the prepreg, occurrence of clogging in a roll coater or a die coater is prevented, in a case of applying a mixture of the component (B) and the component (C) to a surface of released paper with an even thickness.

(Thermosetting Polyimide Particles of Component (c1))

A polyimide resin configuring the thermosetting polyimide particles of the component (c1) is a polymer compound having an imide bond in a repeating structure. In the polyimide resin, a polyimide resin which has a comparatively low molecular weight of a main chain and including a reactive terminal group is the thermosetting polyimide resin. Since the thermosetting polyimide resin includes a reactive terminal group, the interface state between the thermosetting polyimide particles and the matrix resin can be reinforced in the fiber-reinforced composite material, and an effect of the thermosetting polyimide particles which will be described later can be sufficiently exhibited. Thermoplastic polyimide resin having a comparatively great molecular weight and substantially not including a reactive terminal group cannot reinforce the interface state with the matrix resin, and has a comparatively excellent toughness than that of thermosetting polyimide. Accordingly, the effect of the thermosetting polyimide particles which will be described later cannot be sufficiently exhibited.

The thermosetting polyimide resin which can be preferably used as a constituent resin of the thermosetting polyimide particles is a thermosetting polyimide resin having a chemical structure of General Formula (1), and is, specifically, a thermosetting polyimide resin which is produced from benzophenone tetracarboxylic acid dianhydride (BTDA), 4,4'-methylenedianiline (MDA), and 2,4-toluenediamine (TDA), and has a non-phthalimide carbon content including aromatic carbon of 90% to 92%. As the particles of the commercially available product of thermosetting polyimide resin, P84 (registered trademark) Polyimide manufactured by HP Polymer is used.

[Chemical Formula 3]

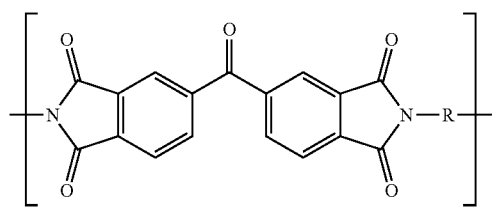

(1)

(R in Formula (1) represents a divalent linking group.)

Examples of divalent linking group include -Ph- and -Ph-CH$_2$-Ph-. Here, -Ph- represents a phenylene group.

The thermosetting polyimide resin is a thermosetting polyimide resin having a chemical structure of General Formula (2), and a thermosetting polyimide resin produced from pyromellitic dianhydride and 4,4'-diaminodiphenyl ether can also be preferably used as the thermosetting polyimide particles of the component (c1). Examples of the particles of the commercially available product of thermosetting polyimide resin include polyimide powder PIP series, PIP-3, and PIP-25 manufactured by Yamaso Micron.

[Chemical Formula 4]

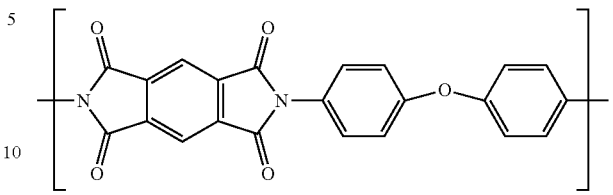

(2)

As the particles of the commercially available product of thermoplastic polyimide resin which cannot be preferably used as the polyimide resin configuring the thermosetting polyimide particles of the component (c1), Matrimid (registered trademark) 5218 manufactured by Huntsman is used.

(Average Particle Diameter of Thermosetting Polyimide Particles of Component (c1))

An average particle diameter of the thermosetting polyimide particles of the component (c1) is preferably 2 to 50 µm and more preferably 5 to 35 µm. In a case where the average particle diameter of the thermosetting polyimide particles is equal to or greater than the lower limit value of the range described above, the component (C) hardly permeates the component (A), in a case of producing the prepreg. Accordingly, a prepreg satisfying a condition in which 70 mass % or more of the entire component (C) is present on a surface of the component (A) is easily obtained, thereby applying more excellent layer fracture toughness to the fiber-reinforced composite material. In addition, it is possible to prevent an increase in viscosity, in a case where the component (B) and the component (C) are mixed with each other. Further, it is also possible to prevent poor dispersion due to the aggregation.

In a case where the average particle diameter of the thermosetting polyimide particles is equal to or smaller than the upper limit value of the range described above, it is possible to prevent a deterioration in straightness of the reinforced fiber of the component (A) due to the component (C) in the fiber-reinforced composite material. Accordingly, it is possible to prevent a deterioration in mechanical properties of the fiber-reinforced composite material, and keep cracks generated in the interlayer region of the fiber-reinforced composite material due to the peeling-off stress in an off-plate direction, in the interlayer region. In addition, in the producing of the prepreg, occurrence of clogging in a roll coater or a die coater is prevented, in a case of applying a mixture of the component (B) and the component (C) to a surface of released paper with an even thickness.

The average particle diameter of the thermosetting polyimide particles of the component (c1) is preferably 0.5 to 10 times the average particle diameter of the polyamide particles of the component (c1). In a case where the average particle diameter of the thermosetting polyimide particles of the component (c1) is 0.5 times or more of the average particle diameter of the polyamide particles of the component (c1), an effect of a combination use of the polyamide particles of the component (c1) and the thermosetting polyimide particles of the component (c1) which will be described later can be sufficiently exhibited. In addition, in a case where the average particle diameter of the thermosetting polyimide particles of the component (c1) is 10 times or less of the average particle diameter of the polyamide particles of the component (c1), it is possible to homogenize a thickness of the interlayer region, that is, prevent a deterioration in straightness of the reinforced fiber of the component (A). Accordingly, it is possible to prevent a deterioration in mechanical properties of the fiber-reinforced composite material, and keep cracks generated in the interlayer region of the fiber-reinforced composite material due to the peeling-off stress in an off-plate direction, in the interlayer region.

(Effect of Combination Use of Polyamide Particles of Component (c1) and Thermosetting Polyimide Particles of component (c1))

In general, the thermosetting polyimide resin has a comparatively poor toughness, and in a case of a single use, more excellent interlayer fracture toughness cannot be applied to the fiber-reinforced composite material. Meanwhile, cracks generated in the interlayer region of the fiber-reinforced composite material due to the peeling-off stress in an off-plate direction has properties of selectively proceeding a portion having a poorer toughness, for example, the interface of the matrix resin and the reinforced fiber bunch. Accordingly, in a case where a high-toughness matrix resin or fine particles of the related art are disposed in the interlayer region, the cracks generated in the interlayer region are gradually transferred to the interface of the matrix resin and the reinforced fiber bunch having a poorer toughness according to the proceeding, and finally, the cracks are completely transferred from the interlayer region to the reinforced fiber layer, and stable and excellent interlayer fracture toughness cannot be applied. However, in a case where the thermosetting polyimide particles having a poor toughness are disposed in the interlayer region of the fiber-reinforced composite material, the cracks generated in the interlayer region stably proceeds to the interlayer region. By using the polyamide particles of the component (c1) and the thermosetting polyimide particles of the component (c1) in combination, the cracks generated in the interlayer region stably proceeds to the interlayer region, and the interlayer fracture toughness can be applied by adding the polyamide particles of the component (c1). Accordingly, it is possible to stably obtain the interlayer fracture toughness, regardless of the morphology of the interlayer region of the fiber-reinforced composite material or the interface state between the polyamide particles of the component (c1) and the matrix resin composition.

(Content of Polyamide Particles of Component (c1) and Thermosetting Polyimide Particles of component (c1))

A total content of the polyamide particles of the component (c1) and the thermosetting polyimide particles of the component (c1) is 5 to 25 parts by mass, preferably 10 to 25 parts by mass, more preferably 12 to 25 parts by mass, and even more preferably 15 to 20 parts by mass, with respect to 100 parts by mass of the component (B). In a case where the total content of the polyamide particles of the component (c1) and the thermosetting polyimide particles of the component (c1) is equal to or greater than the lower limit value of the range described above, the amount of the polyamide particles of the component (c1) and the thermosetting polyimide particles of the component (c1) unevenly distributed in the interlayer region increases, and the excellent interlayer fracture toughness can be stably applied to the fiber-reinforced composite material, due to the reason described above. In a case where the content of the polyamide particles of the component (c1) is equal to or smaller than the upper limit value of the range described above, it is possible to prevent an excessive decrease in amount of the component (B) included in the prepreg, for example, the component (B) occupying the matrix resin comprising the polyamide particles of the component (c1) and the thermosetting polyimide particles of the component (c1). That is, it is possible to prevent a deterioration in mechanical properties of the fiber-reinforced composite material due to the insufficient component (B), or prevent an excessive increase in viscosity of the matrix resin composition to sufficient immerse the matrix resin composition in the component (A) in a case of producing the prepreg.

(Percentage of Thermosetting Polyimide Particles in Component (c1))

A percentage of the thermosetting polyimide particles in the component (c1) is preferably 10 to 40 mass %. In a case where the percentage of the thermosetting polyimide particles is equal to or greater than the lower limit value of the range described above, it is possible to sufficiently obtain the effect of the thermosetting polyimide particles and stably apply excellent interlayer fracture toughness to the fiber-reinforced composite material due to the reason described above. In a case where the percentage of the thermosetting polyimide particles is equal to or smaller than the upper limit value of the range described above, it possible to prevent an increase of negative effect of the thermosetting polyimide particles having a poor toughness applied to the interlayer fracture toughness to the fiber-reinforced composite material.

The more preferable percentage of the thermosetting polyimide particles greatly depends on a combination of constituent elements. For example, in a case where the interface of the component (A) and the component (B) is weaker, the cracks generated in the interlayer region more easily proceeds to the interface of the component (A) and the component (B). Accordingly, the percentage of the thermosetting polyimide particles in the component (c1) is preferably set to be greater as 20 to 40 mass % with respect to a total mass of the component (c1). On the other hand, in a case where the interface of the component (A) and the component (B) is stronger, the cracks generated in the interlayer region hardly proceeds to the interface of the component (A) and the component (B). Accordingly, the percentage of the thermosetting polyimide particles in the component (c1) is preferably set to be smaller as 10 to 25 mass % with respect to a total mass of the component (c1). In addition, in a case where the interface of the component (B) and the component (C) is weaker, the cracks generated in the interlayer region more easily proceeds to the interface of the component (A) and the component (B). Accordingly, the percentage of the thermosetting polyimide particles in the component (c1) is preferably set to be greater as 20 to 40 mass % with respect to a total mass of the component (c1). On the other hand, in a case where the interface of the component (B) and the component (C) is stronger, the cracks generated in the interlayer region hardly proceeds to the interface of the component (A) and the component (B). Accordingly, the percentage of the thermosetting polyimide particles in the component (c1) is preferably set to be smaller as 10 to 25 mass % with respect to a total mass of the component (c1). In a case of the weak interface of the component (A) and the component (B) and the weak interface of the component (B) and the component (C), the percentage of the thermosetting polyimide particles in the component (c1) is preferably set to be greater as 25 to 40 mass % with respect to a total mass of the component (c1). In a case of the strong interface of the component (A) and the component (B) and the strong interface of the component (B) and the component (C), the percentage of the thermosetting polyimide particles in the component (c1) is preferably set to be smaller as 10 to 20 mass % with respect to a total mass of the component (c1).

Here, the weak interface of the component (A) and the component (B) means that a strength of a 90° bending test of the fiber-reinforced composite material in one direction of implementation (all of reinforced fibers are aligned in the same direction) based on ASTM D790 is smaller than 125 MPa.

The strong interface of the component (A) and the component (B) means that a strength of the 90° bending test of the fiber-reinforced composite material in one direction of implementation (all of reinforced fibers are aligned in the same direction) based on ASTM D790 is equal to or greater than 125 MPa.

The weak interface of the component (B) and the component (C) is a state in which a fracture surface of a double cantilever beam (DCB) test of the fiber-reinforced composite material of the implementation based on ASTM D5528 is observed using a scanning electron microscope (SEM), and the interface of the component (C) 30 is exposed as shown in FIG. 1.

Figure 2:
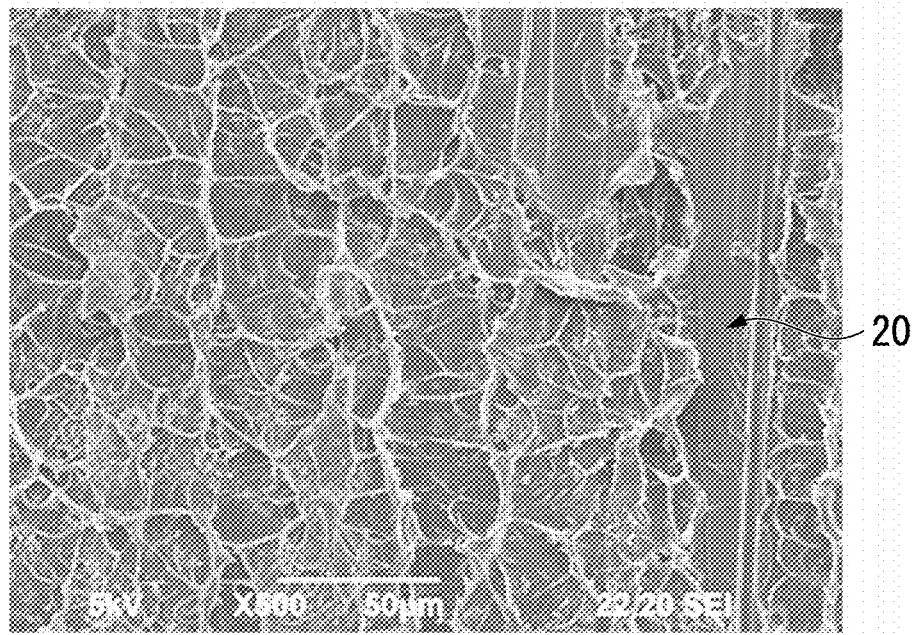
FIG. 2 is a fracture surface SEM image of a fiber-reinforced composite material in a DCB test (pattern that an interface of a component (C) is not exposed).

The strong interface of the component (B) and the component (C) is a state in which a fracture surface of a double cantilever beam (DCB) test of the fiber-reinforced composite material of the implementation based on ASTM D5528 is observed using a scanning electron microscope (SEM), and the interface of the component (C) is not exposed as shown in FIG. 2.

Spherical Polyamide Particles Having Melting Point of 140° C. to 175° C. of Component (c2)

The polyamide particles are a particulate polyamide resin and can apply more excellent interlayer fracture toughness to the fiber-reinforced composite material. The polyamide resin is a compound having an amide bond in a repeating structure. The polyamide may be a polyamide resin comprising one kind of polyamide resin or a polyamide resin comprising two or more kinds of polyamide resin. In a case of the polyamide resin particles comprising two or more kinds of polyamide resin, each polyamide resin may be evenly present in the particles or unevenly present as in a case of a layered structure. The polyamide resin can be obtained, for example, by a method of ring-opening polymerization of lactams, condensation polymerization of diamine and dicarboxylic acid, or condensation polymerization of amino carboxylic acid. Specific examples of the polyamide resin include polyamide resins having an aromatic ring or an alicyclic ring such as nylon 6, nylon 46, nylon 66, nylon 11, nylon 12, nylon 610, nylon 612, nylon 6 T, nylon 6 I, nylon 9 T, nylon M5T, and TROGAMID (registered trademark) T5000 and TROGAMID (registered trademark) CX7323 manufactured by Daicel-Evonik Ltd.

Examples of a commercially available product of the polyamide resin include VESTOSINT series (VESTOSINT (registered trademark) 2158, VESTOSINT (registered trademark) 2159, and the like) manufactured by Daicel-Evonik Ltd., GRILAMID (registered trademark) TR9ONZ, GRILAMID (registered trademark) TR55 manufactured by EMS-CHEMIE (Japan) Ltd., and TROGAMID (registered trademark) CX7323 and TROGAMID (registered trademark) T5000 manufactured by Daicel-Evonik Ltd.

Meanwhile, since the component (c2) includes spherical polyamide particles having a melting point of 140° C. to 175° C., a crystalline polyamide resin is preferably used as the polyamide resin of the component (c2). Specific examples of the crystalline polyamide resin include nylon 6, nylon 46, nylon 66, nylon 11, nylon 12, nylon 610, nylon 612, nylon 6T, nylon 6I, nylon 9T, and nylon M5T. Since a melting point of most of homopolymer is not 140° C. to 175° C., due to high crystallinity, a copolymer capable of further decreasing the melting point is preferable as the polyamide resin of the component (C), because of the crystallinity inhibition. Among these, crystalline nylon copolymer particles are preferable, and spherical particles comprising a copolymer of nylon 12 and nylon 6 are more preferable. The copolymer of nylon 12 and nylon 6 including nylon 12 as a main component is preferable, because high toughness and low moisture absorption are realized, a melting point thereof is lower than the melting point of nylon 12, and a toughness can be suitably applied to the fiber-reinforced composite material in a wider range of the molding conditions. A molar ratio of nylon 12 and nylon 6 in the copolymer of nylon 12 and nylon 6 (nylon 12:nylon 6) is preferably 9.8:0.2 to 6.5:3.5 and more preferably 9.5:0.5 to 7:3. In a case where the percentage of nylon 12 in the copolymer of nylon 12 and nylon 6 is greater than 90 mol %, the melting point is not sufficiently decreased than the melting point of nylon 12. Accordingly, a toughness may not be suitably applied to the fiber-reinforced composite material in a wider range of the molding conditions. On the other hand, in a case where the percentage of nylon 12 is smaller than 60 mol %, an effect of nylon 6 having a inciting point higher than that of nylon 12 increases, and the melting point of the copolymer of nylon 12 and nylon 6 increases. Accordingly, a toughness may not be suitably applied to the fiber-reinforced composite material in a wider range of the molding conditions. As a commercially available product of the suitably usable spherical particles of the copolymer of nylon 12 and nylon 6, MW-330 manufactured by SC Environmental Science Co., Ltd. is used.

(Shape of Spherical Polyamide Particles Having Melting Point of 140° C. to 175° C. of Component (c2))

The shape of the spherical polyamide particles having a melting point of 140° C. to 175° C. is a spherical shape. Specifically, the spherical particles indicates particles having an average value of a ratio of a short diameter to a long diameter (short diameter/long diameter) of 10 particles of equal to or greater than 0.9, by measuring short diameters and long diameters of the randomly selected 10 particles using a scanning electron microscope (manufactured by JEOL Ltd., JSM-6390).

(Average Particle Diameter of Spherical Polyamide Particles Having Melting Point of 140° C. to 175° C. of Component (c2))

An average particle diameter of the spherical polyamide particles having a melting point of 140° C. to 175° C. is preferably 2 to 50 μm, more preferably 5 to 35 μm, and even more preferably 6 to 25 μm. In a case where the average particle diameter of the spherical polyamide particles is equal to or greater than the lower limit value of the range described above, the component (C) hardly permeates the component (A), during the producing of the prepreg. Accordingly, a prepreg satisfying a condition in which 70 mass % or more of the entire component (C) is present on a surface of the component (A) which will be described later is easily obtained, thereby applying more excellent layer fracture toughness to the fiber-reinforced composite material. In addition, it is possible to prevent an increase in viscosity, in a case where the component (B) and the component (C) are mixed with each other. In a case where the average particle diameter of the spherical polyamide particles is equal to or smaller than the upper limit value of the range described above, it is possible to prevent a deterioration in straightness of the reinforced fiber of the component (A) due to the component (C) in the fiber-reinforced composite material. Accordingly, it is possible to prevent a deterioration in mechanical properties of the fiber-reinforced composite material, and keep cracks generated in the interlayer region of the fiber-reinforced composite material due to the peeling-off stress in an off-plate direction, in the interlayer region. In addition, in the producing of the prepreg, occurrence of clogging in a roll coater or a die coater is prevented, in a case of applying a mixture of the component (B) and the component (C) to a surface of released paper with an even thickness.

The component (c2) of the invention preferably further includes thermosetting polyimide particles.

(Thermosetting Polyimide Particles Capable of Being Included in Component (c2))

The thermosetting polyimide particles capable of being included in the component (c2) mean thermosetting polyimide particles capable of being used as the component (C) in combination with the spherical polyamide particles having a melting point of 140° C. to 175° C. of the component (c2). The thermosetting polyimide particles capable of being included in the component (c2) are thermosetting polyimide particles. The polyimide resin is a polymer compound having an imide bond in a repeating structure. In the polyimide resin, a polyimide resin which has a comparatively low molecular weight of a main chain and including a reactive terminal group is the thermosetting polyimide resin. Since the thermosetting polyimide resin includes a reactive terminal group, the interface state between the thermosetting polyimide particles and the matrix resin can be reinforced in the fiber-reinforced composite material, and an effect of the thermosetting polyimide particles capable of being included in the component (c2) which will be described later can be sufficiently exhibited. Thermoplastic polyimide resin having a comparatively great molecular weight and substantially not including a reactive terminal group cannot reinforce the interface state with the matrix resin, and has a comparatively excellent toughness than that of thermosetting polyimide. Accordingly, the effect of the thermosetting polyimide particles capable of being included in the component (c2) which will be described later cannot be sufficiently exhibited.

The thermosetting polyimide resin which can be preferably used as the thermosetting polyimide particles capable of being included in the component (c2) is a thermosetting polyimide resin having a chemical structure of General Formula (1), and is, specifically, a thermosetting polyimide resin which is produced from benzophenone tetracarboxylic acid dianhydride (RTDA), 4,4'-methylenedianiline (MDA), and 2,4-toluenediamine (TDA), and has a non-phthalimide carbon content including aromatic carbon of 90% to 92%. As the particles of the commercially available product of thermosetting polyimide resin, P84 (registered trademark) Polyimide manufactured by HP Polymer is used.

[Chemical Formula 5]

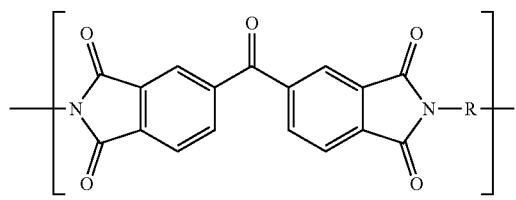

(1)

(R in Formula (1) represents a divalent linking group.)
Examples of divalent linking group include -Ph- and -Ph-CH$_2$-Ph-. Here, -Ph- represents a phenylene group.

The thermosetting polyimide resin is a thermosetting polyimide resin having a chemical structure of General Formula (2), and a thermosetting polyimide resin produced from pyromellitic dianhydride and 4,4'-diaminodiphenyl ether can also be preferably used as the component (c2). Examples of the particles of the commercially available product of thermosetting polyimide resin include polyimide powder PIP series, for example, PIP-3, and PIP-25 manufactured by Yamaso Micron.

[Chemical Formula 6]

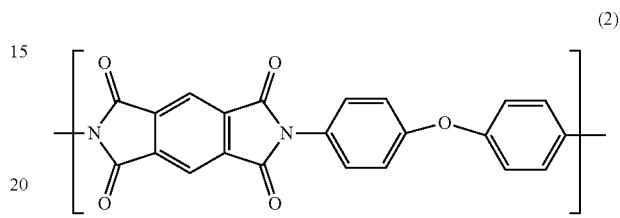

(2)

As a commercially available product of thermoplastic polyimide resin which cannot be preferably used as the thermosetting polyimide particles capable of being included in the component (c2), Matrimid (registered trademark) 5218 manufactured by Huntsman is used.

(Average Particle Diameter of Thermosetting Polyimide Particles Capable of Being Included in Component (c2))

An average particle diameter of the thermosetting polyimide particles capable of being included in the component (c2) is preferably 2 to 50 μm and more preferably 5 to 35 μm. In a case where the average particle diameter of the thermosetting polyimide particles is equal to or greater than the lower limit value of the range described above, the thermosetting polyimide particles hardly permeate the component (A), in a case of producing the prepreg. Accordingly, a prepreg satisfying a condition in which 70 mass % or more of the entire component (C) is present on a surface of the component (A) is easily obtained, thereby applying more excellent layer fracture toughness to the fiber-reinforced composite material. In addition, it is possible to prevent an increase in viscosity, in a case where the component (B) and the thermosetting polyimide particles are mixed with each other. Further, it is also possible to prevent poor dispersion due to the aggregation.

In a case where the average particle diameter of the thermosetting polyimide particles is equal to or smaller than the upper limit value of the range described above, it is possible to prevent a deterioration in straightness of the reinforced fiber of the component (A) due to the thermosetting polyimide particles in the fiber-reinforced composite material. Accordingly, it is possible to prevent a deterioration in mechanical properties of the fiber-reinforced composite material, and keep cracks generated in the interlayer region of the fiber-reinforced composite material due to the peeling-off stress in an off-plate direction, in the interlayer region. In addition, in the producing of the prepreg, occurrence of clogging in a roll coater or a die coater is prevented, in a case of applying a mixture of the component (B) and the thermosetting polyimide particles to a surface of released paper with an even thickness.

The average particle diameter of the thermosetting polyimide particles is preferably 0.5 to 10 times the average particle diameter of the spherical polyamide particles having a melting point of 140° C. to 175° C. In a case where the average particle diameter of the thermosetting polyimide particles is 0.5 times or more of the average particle diameter of the spherical polyamide particles having a melting point of 140° C. to 175° C., an effect of a combination use of the spherical polyamide particles having a melting point of 140° C. to 175° C. and the thermosetting polyimide particles which will be described later can be sufficiently exhibited. In addition, in a case where the average particle diameter of the thermosetting polyimide particles is 10 times or less of the average particle diameter of the spherical polyamide particles having a melting point of 140° C. to 175° C., it is possible to homogenize a thickness of the interlayer region, that is, prevent a deterioration in straightness of the reinforced fiber of the component (A). Accordingly, it is possible to prevent a deterioration in mechanical properties of the fiber-reinforced composite material, and keep cracks generated in the interlayer region of the fiber-reinforced composite material due to the peeling-off stress in an off-plate direction, in the interlayer region.

(Effect of Combination Use of Spherical Polyamide Particles Having Melting Point of 140° C. to 175° C. and Thermosetting Polyimide Particles of Component (c2))

In general, the thermosetting polyimide resin has a comparatively poor toughness, and in a case of a single use, more excellent interlayer fracture toughness cannot be applied to the fiber-reinforced composite material. Meanwhile, cracks generated in the interlayer region of the fiber-reinforced composite material due to the peeling-off stress in an off-plate direction has properties of selectively proceeding a portion having a poorer toughness, for example, the interface of the matrix resin and the reinforced fiber bunch. Accordingly, in a case where a high-toughness matrix resin or fine particles of the related art are disposed in the interlayer region, the cracks generated in the interlayer region are gradually transferred to the interface of the matrix resin and the reinforced fiber bunch having a poorer toughness according to the proceeding, and finally, the cracks are completely transferred from the interlayer region to the reinforced fiber layer, and stable and excellent interlayer fracture toughness cannot be applied. However, in a case where the thermosetting polyimide particles having a poor toughness are disposed in the interlayer region of the fiber-reinforced composite material, the cracks generated in the interlayer region stably proceeds to the interlayer region. By using the spherical polyamide particles having a melting point of 140° C. to 175° C. and the thermosetting polyimide particles in combination, the cracks generated in the interlayer region stably proceeds to the interlayer region, and the interlayer fracture toughness can be applied by adding the spherical polyamide particles having a melting point of 140° C. to 175° C. Accordingly, it is possible to stably obtain the interlayer fracture toughness, regardless of the morphology of the interlayer region of the fiber-reinforced composite material or the interface state between the spherical polyamide particles having a melting point of 140° C. to 175° C. and the matrix resin composition.

(Content of spherical Polyamide Particles Having Melting Point of 140° C. to 175° C. of Component (c2))

A content of the spherical polyamide particles having a melting point of 140° C. to 175° C. is 5 to 25 parts by mass, preferably 10 to 25 parts by mass, more preferably 12 to 25 parts by mass, and even more preferably 15 to 20 parts by mass, with respect to 100 parts by mass of the component (B). In a case where the content of the component (C) is equal to or greater than the lower limit value of the range described above, the amount of the spherical polyamide particles unevenly distributed in the interlayer region increases, and the excellent interlayer fracture toughness can be stably applied to the fiber-reinforced composite material, due to the reason described above. In a case where the content of the spherical polyamide particles is equal to or smaller than the upper limit value of the range described above, it is possible to prevent an excessive decrease in amount of the component (B) included in the prepreg, for example, the component (B) occupying the matrix resin comprising the component (B) and the component (C). That is, it is possible to prevent a deterioration in mechanical properties of the fiber-reinforced composite material due to the insufficient component (B), or prevent an excessive increase in viscosity of the matrix resin composition to sufficient immerse the matrix resin composition in the component (A) in a case of producing the prepreg.

(Content of Spherical Polyamide Particles Having Melting Point of 140° C. to 175° C. and Thermosetting Polyimide Particles of Component (c2))

In a case where the component (c2) further includes the thermosetting polyimide particles, a total content of the spherical polyamide particles having a melting point of 140° C. to 175° C. and the thermosetting polyimide particles is 5 to 25 parts by mass, preferably 10 to 25 parts by mass, more preferably 12 to 25 parts by mass, and even more preferably 15 to 20 parts by mass, with respect to 100 parts by mass of the component (B). In a case where the total content of the spherical polyamide particles having a melting point of 140° C. to 175° C. and the thermosetting polyimide particles is equal to or greater than the lower limit value of the range described above, the amount of the spherical polyamide particles having a melting point of 140° C. to 175° C. and the thermosetting polyimide particles unevenly distributed in the interlayer region increases, and the excellent interlayer fracture toughness can be stably applied to the fiber-reinforced composite material, due to the reason described above. In a case where the content of the spherical polyamide particles having a melting point of 140° C. to 175° C. is equal to or smaller than the upper limit value of the range described above, it is possible to prevent an excessive decrease in amount of the component (B) included in the prepreg, for example, the component (B) occupying the matrix resin comprising the spherical polyamide particles having a melting point of 140° C. to 175° C. and the thermosetting polyimide particles. That is, it is possible to prevent a deterioration in mechanical properties of the fiber-reinforced composite material due to the insufficient component (B), or prevent an excessive increase in viscosity of the matrix resin composition to sufficient immerse the matrix resin composition in the component (A) in a case of producing the prepreg.

(Percentage of Thermosetting Polyimide Particles Occupying Content of Spherical Polyamide Particles Having Melting Point of 140° C. to 175° C. and Thermosetting Polyimide Particles of Component (c2))

A percentage of the thermosetting polyimide particles occupying a mixture of the spherical polyamide particles having a melting point of 140° C. to 175° C. and the thermosetting polyimide particles is preferably 5 to 40 mass % with respect to a total content of the spherical polyamide particles having a melting point of 140° C. to 175° C. and the thermosetting polyimide particles. In a case where the percentage of the thermosetting polyimide particles is equal to or greater than the lower limit value of the range described above, it is possible to sufficiently obtain the effect of the thermosetting polyimide particles and stably apply excellent interlayer fracture toughness to the fiber-reinforced composite material due to the reason described above. In a case where the percentage of the thermosetting polyimide particles is equal to or smaller than the upper limit value of the range described above, it possible to prevent an increase of negative effect of the thermosetting polyimide particles having a poor toughness applied to the interlayer fracture toughness to the fiber-reinforced composite material.

The more preferable percentage of the thermosetting polyimide particles greatly depends on a combination of constituent elements. For example, in a case where the interface of the component (A) and the component (B) is weaker, the cracks generated in the interlayer region more easily proceeds to the interface of the component (A) and the component (B). Accordingly, the percentage of the thermosetting polyimide particles is preferably set to be greater as 20 to 40 mass %. On the other hand, in a case where the interface of the component (A) and the component (B) is stronger, the cracks generated in the interlayer region hardly proceeds to the interface of the component (A) and the component (B). Accordingly, the percentage of the thermosetting polyimide particles is preferably set to be smaller as 5 to 25 mass %. In addition, in a case where the interface of the component (B) and the spherical polyamide particles having a melting point of 140° C. to 175° C. is weaker, the cracks generated in the interlayer region more easily proceeds to the interface of the component (A) and the component (B). Accordingly, the percentage of the thermosetting polyimide particles is preferably set to be greater as 20 to 40 mass %. On the other hand, in a case where the interface of the component (B) and the spherical polyamide particles having a melting point of 140° C. to 175° C. is stronger, the cracks generated in the interlayer region hardly proceeds to the interface of the component (A) and the component (B). Accordingly, the percentage of the thermosetting polyimide particles is preferably set to be smaller as 5 to 25 mass %. In a case of the weak interface of the component (A) and the component (B) and the weak interface of the component (B) and the spherical polyamide particles having a melting point of 140° C. to 175° C., the percentage of the thermosetting polyimide particles is preferably set to be greater as 25 to 40 mass %. In a case of the strong interface of the component (A) and the component (B) and the strong interface of the component (B) and the spherical polyamide particles having a melting point of 140° C. to 175° C., the percentage of the thermosetting polyimide particles is preferably set to be smaller as 5 to 20 mass %.

Here, the weak interface of the component (A) and the component (B) means that a strength of a 90° bending test of the fiber-reinforced composite material in one direction of implementation (all of reinforced fibers are aligned in the same direction) based on ASTM D790 is smaller than 125 MPa. The weak interface of the component (B) and the spherical polyamide particles having a melting point of 140° C. to 175° C. or weak interface of the component (B) and the thermosetting polyimide particles capable of being included in the component (c2) is a state in which a fracture surface of a double cantilever beam (DCB) test of the fiber-reinforced composite material of the implementation based on ASTM D5528 is observed using a scanning electron microscope (SEM), and the interface of the spherical polyamide particles having a melting point of 140° C. to 175° C. or the interface of the thermosetting polyimide particles is exposed.

(Fiber Basis Weight of Prepreg)

A fiber basis weight of the prepreg (content of reinforced fiber per 1 $m^2$: FAW) may be suitably set according to the use of the prepreg, and is normally 50 to 300 $g/m^2$.

(Resin Content of Prepreg)

A resin content (total percentage of component (B) and component (C)) in the prepreg is preferably 25 to 50 mass % and more preferably 30 to 40 mass % with respect to a total mass of the prepreg. In a case where the resin content in the prepreg is equal to or greater than the lower limit value of the range described above, it is possible to prevent an excessive decrease in tackiness of the prepreg and realize tackiness suitable for handling. In addition, it is also possible to prevent a deterioration in mechanical properties of the fiber-reinforced composite material due to the insufficient component (B). In a case where the resin content in the prepreg is equal to or smaller than the upper limit value of the range described above, it is possible to prevent an excessive increase in tackiness of the prepreg and realize tackiness suitable for handling. In addition, it is also possible to prevent a deterioration in mechanical properties of the fiber-reinforced composite material accompanied with the improvement of Vf (volume fraction of the reinforced fiber in the fiber-reinforced composite material) due to the excessive amount of the component (B).

(Thickness of Prepreg)

A thickness of the prepreg may be suitably set according to the use of the prepreg, and is normally 0.05 to 0.3 mm.

The thickness of the prepreg can be measured with a thickness gage.

(Producing Method of Prepreg)

The prepreg of the invention can be produced by the method disclosed in Patent Document 2, according to the use thereof.

As the producing method of the prepreg, from viewpoints that the component (C) is easily unevenly distributed in the interlayer region and the fiber-reinforced composite material satisfying conditions (a) to (c) which will be described later is easily produced, one method selected from the group consisting of a method (α), a method (β), a method (γ), and a method (δ) is preferable, and from viewpoints that the component (C) can be more unevenly distributed in the interlayer region and a deterioration of a producing environment due to fluttering of a large amount of the component (C) during the producing can be prevented, the method (γ) or a method (δ) is more preferable.

Method (α):

The method (α) is a method of bonding a resin film (F1) comprising the component (B) to one or both surfaces of the component (A), immersing the component (B) in the component (A) to produce a base prepreg (P1), and scattering the component (C) on one or both surfaces of the base prepreg (P1).

The resin film (F1) can be produced by applying the component (B) to a surface of released paper or the like. As a method of immersing the component (B) in the component (A), a well-known method such as a method of heating and pressing with a hot press roll is used.

Method (β):

The method (β) is a method of bonding the resin film (F1) comprising the component (B) to one or both surfaces of the component (A), immersing the component (B) in the component (A) to produce the base prepreg (P1), and bonding a resin film (F2) in which the component (C) is scattered on the surface of the component (B), to one or both surfaces of the base prepreg (P1).

The resin film (F1) and the base prepreg (P1) can be produced in the same manner as in the method (α). The resin film (F2) can be produced by applying the component (B) to a surface of released paper or the like and scattering the component (C) on the surface of the component (B).

As a bonding method of the resin film (F2) to the base prepreg (P1), a well-known method of heating and pressing with a hot press roll is used. In a case where a temperature is excessively high, a large amount of the component (B) included in the resin film (F2) is immersed in the component (A) of the base prepreg (P1), the tackiness of the prepreg is substantially eliminated, and a problem may occur during the producing of the fiber-reinforced composite material. In a case where a pressure is excessively high, a large amount of the component (C) included in the resin film (F2) permeates the component (A) of the base prepreg (P1), the straightness of the reinforced fiber may be deteriorated, or the component (C) may be substantially eliminated from the surface of the component (A).

The component (B) included in the base prepreg (P1) and the component (B) included in the resin film (F2) may have the same resin composition or different resin compositions.

From a viewpoint of the method ((3) of further bonding the resin film (F2) to the base prepreg (P1), a content of the component (B) in the base prepreg (P1) is preferably set to be lower than that in the method (a).

Method ($\gamma$):

The method ($\gamma$) is a method of bonding the resin film (F1) comprising the component (B) to one or both surfaces of the component (A), immersing the component (B) in the component (A) to produce the base prepreg (P1), and bonding a resin film (F3) including the component (B) and the component (C) to one or both surfaces of the base prepreg (P1).

The base prepreg (P1) can be produced in the same manner as in the method ($\alpha$).

The resin film (F3) can be produced by applying a mixture of the component (B) and the component (C) to a surface of released paper or the like.

As a bonding method of the resin film (F3) to the base prepreg (P1), a well-known method of heating and pressing with a hot press roll is used. In a case where a temperature is excessively high, a large amount of the component (B) included in the resin film (F3) is immersed in the component (A) of the base prepreg (P1), the tackiness of the prepreg is substantially eliminated, and a problem may occur during the producing of the fiber-reinforced composite material. In a case where a pressure is excessively high, a large amount of the component (C) included in the resin film (F3) permeates the component (A) of the base prepreg (P1), the straightness of the reinforced fiber may be deteriorated, or the component (C) may be substantially eliminated from the surface of the component (A).

The component (B) included in the base prepreg (P1) and the component (B) included in the resin film (F3) may have the same resin composition or different resin compositions.

From a viewpoint of the method ($\gamma$) of further bonding the resin film (F3) to the base prepreg (P1), a content of the component (B) in the base prepreg (P1) is preferably set to be lower than that in the method ($\alpha$).

Method ($\delta$):

The method ($\delta$) is a method of bonding the resin film (F3) including the component (B) and the component (C) or the resin film (F3) including the component (B) and the component (C) to one or both surfaces of the component (A), and immersing the component (B) in the component (A).

The resin film (F3) can be produced in the same manner as in the method ($\gamma$).

The component (C) is filtered on the component (A), and the component (C) is unevenly distributed in the vicinity of the surface of the prepreg. Since the component (C) is filtered on the component (A), the average particle diameter of the component (C) is preferably greater than those in other methods. An average particle diameter of the polyamide particles of the component (c1) and the spherical polyamide particles having a melting point 140° C. to 175° C. of the component (c2) is preferably 5 to 50 μm, more preferably 10 to 50 μm, and even more preferably 15 to 50 μm. In addition, an average particle diameter of the thermosetting polyimide particles of the component (c1) and the thermosetting polyimide particles capable of being included in the component (c2) is preferably 15 to 50 μm, more preferably 20 to 50 μm, and even more preferably 25 to 50 μm.

Fiber-Reinforced Composite Material

A fiber-reinforced composite material of a first aspect of the invention is obtained by laminating two or more prepregs, and curing the component (B) by heating at a temperature equal to or higher than a curing temperature of the component (B).

A temperature in a case of heating and heat molding of the laminated prepreg may be any temperature, as long as it is a temperature at which the component (B) can be suitably cured, and is preferably 170° C. to 190° C., from a viewpoint of a period of time necessary for curing the component (B) of equipment used in the heat molding. In a case where the temperature during the heat molding is equal to or higher than 170° C., the component (B) is sufficiently cured, and a cured material having higher heat resistance can be obtained. In a case where the temperature during the heat molding is equal to or lower than 190° C., lower-cost equipment or a secondary material used for heat molding can be used.

The interface of the component (B) and the component (C) is set to be stronger and the cracks generated in the interlayer region of the cured material more hardly proceed to the interface of the component (A) and the component (B). Accordingly, in a case where the component (C) is crystalline, the curing is preferably performed at a temperature equal to or higher than the melting point of the component (C), and in a case where the component (C) is amorphous, the curing is preferably performed at a temperature equal to or higher than the glass transition temperature of the component (C).

The heat molding time may be a period of time in which the component (B) can be sufficiently cured and which is suitable for the heat molding method which will be described later. In a case of an autoclave molding method, the heat molding time is preferably 1 to 4 hours. In a case where the heat molding time is equal to or longer than 1 hour, the curing of the component (B) is sufficient. In a case where the heat molding time exceeds 4 hours, the producing cost further increase.

As the heat molding method, a well-known method such as an autoclave molding method, an oven molding method, or a press molding method are used. As the heat molding method, the autoclave molding method is preferable, from a viewpoint of obtaining the fiber-reinforced composite material having more excellent mechanical properties.

A fiber-reinforced composite material of a second aspect of the invention includes the component (A), a component (B'), and the component (C), the component (A) is a reinforced fiber substrate, the component (B') is a cured material of the epoxy resin composition, the component (C) is the component (c1) or the component (c2), the component (c1) includes polyamide particles and thermosetting polyimide particles, and the component (c2) includes spherical polyamide particles having a melting point of 140° C. to 175° C.

In the fiber-reinforced composite material of the second aspect of the invention, a plurality of the component (A) are laminated, and the component (C) is present between the layers of the component (A).

As the component (A) and the component (C), the same component (A) and the component (C) described in the description of the prepreg are used.

As the component (B'), a component obtained by curing the component (B) described in the description of the prepreg is used.

As a method of curing the component (B), the component (B) is preferably heated to 170° C. to 190° C. The heating time is preferably 1 to 4 hours.

EXAMPLES

Hereinafter, the invention will be specifically described with reference to examples, and the invention is not limited thereto.

Physical Properties • Evaluation
(Average Particle Diameter)
The average particle diameter of the resin particles was obtained as follows.

Regarding the resin particles, particle diameter distribution measurement was performed by using a laser scattering type particle size measurement device (manufactured by Nikkiso Co., Ltd., MODEL: 7340 microtrack FRA), and cumulative distribution was obtained. A particle diameter (DSO) at cumulative frequency of 50% in a cumulative distribution based on volume was set as the average particle diameter.

Figure 3:
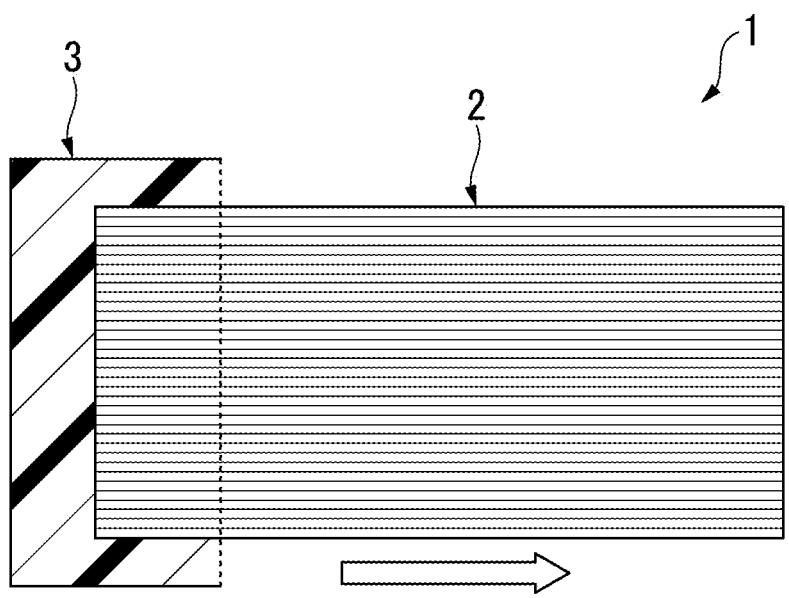
FIG. 3 is a plan view of a forming plate for evaluation used in examples.

Producing of Molding Plate for Evaluation Comprising Fiber-Reinforced Composite Material As shown in FIG. 3, 20 sheets of prepegs 2 were laminated so that a fiber axial direction of the reinforced fiber is aligned. In FIG. 3, an arrow shows the fiber axial direction of the reinforced fiber. A long fluorine resin film 3 having a thickness of 50 μm was interposed between the 10th prepeg 2 and 11th prepreg 2, so that the longitudinal direction is perpendicular to the fiber axial direction of the reinforced fiber and a portion of the fluorine resin film 3 having a width of approximately 70 mm is overlapped with the prepreg 2. A vacuum bag was covered over the laminated prepreg without gaps. The laminated prepreg was heated from room temperature to 180° C. at a rate of temperature increase of 2° C./min or 0.5° C./min using the autoclave and the temperature was maintained for 2 hours. The laminated prepreg was maintained in the autoclave until the temperature becomes equal to or lower than 50° C. at a rate of temperature decrease of 3° C./min. A molding plate 1 for evaluation was extracted from the autoclave. A pressure in the autoclave was set as 0.6 MPa from the start of the heating to the extraction.

(Uneven Distribution Rate of Thermal Deformation Resin Particles)

A test piece having a size of 20 mm×20 mm was cut out from the molding plate for evaluation. A cross section of the test piece was polished by using a polishing machine (manufactured by Refine Tec Ltd., REFINE-POLISHER APM-122). An image of the enlarged cross section of the test piece to 500 times was obtained by using a digital microscope (manufactured by Keyence Corporation, VHX-5000). From the image, the thermal deformation resin particles in the interlayer region between the reinforced fiber substrates and the thermal deformation resin particles in the reinforced fiber substrate were cut out, the mass of the cut out image was measured, and the uneven distribution rate was derived from Expression (3).

Uneven distribution rate=mass of thermal deformation resin particles present in interlayer region/ (mass of thermal deformation resin particles present in interlayer region++mass of thermal deformation region particles in the reinforced fiber substrate)×100     Expression (3)

(Measurement of GIC)
Regarding the molding plate for evaluation, GIC was measured based on ASTM D5528 by using an INSTRON UNIVERSAL TESTING SYSTEMS (manufactured by Instron).

(Measurement of GIIC)
Regarding the molding plate for evaluation, GIIC was measured based on ASTM D7905 by using an INSTRON UNIVERSAL TESTING SYSTEMS (manufactured by Instron).

Raw Material
(Component (A))
(Bunch of Reinforced Fibers)
MR70: bunch of carbon fibers (manufactured by Mitsubishi Chemical Corporation, PYROFIL (registered trademark) MR70 12P, strand strength: 7000 MPa, fiber diameter of carbon fiber: 5 μm, number of carbon fibers: 12000)

(Component (B))
(Epoxy Resin)
TSR-400: epoxy resin having an oxazolidone ring structure (manufactured by DIC Corporation, EPICLON TSR-400)

jER 807: liquid bisphenol F type epoxy resin (manufactured by Mitsubishi Chemical Corporation, jER (registered trademark) 807)

jER 604: Diaminodiphenylmethane semisolid type epoxy resin (manufactured by Mitsubishi Chemical Corporation, jER (registered trademark) 604)

(Curing Agent)
SEIKACURE S: 4,4'-diaminodiphenyl sulfone (manufactured by SEIKA CORPORATION, SEIKACURE S)

(Random Component)
E2020P: polyether sulfone (manufactured by BASF Japan, ULTRASON (registered trademark) E2020 P SR MICRO)

(Component (C))
(Polyamide particles of component (c1))
VESTOSINT 2158: polyamide 12 particles (manufactured by Daicel-Evonik Ltd., VESTOSINT (registered trademark) 2158 natural, melting point: 177° C., average particle diameter: 21 μm)

(Thermosetting Polyimide Particles of component (c1))
p84: thermosetting polyimide particles (manufactured by HP Polymer, P84 (registered trademark) Polyimide, average particle diameter: 17.7 μm)

PIP-3: thermosetting polyimide particles (manufactured by Yamaso Micron, polyimide powder PIP-3, average particle diameter: 2.8 μm)

PIP-25: thermosetting polyimide particles (manufactured by Yamaso Micron, polyimide powder PIP-25, average particle diameter: 12.9 μm)

(Resin Particles Not Included in component (c1))
P84NT1: polyimide particles (manufactured by Daicel-Evonik Ltd., polyimide P84 (registered trademark) NT1, average particle diameter: 8.9 μm)

P84NT2: polyimide particles (manufactured by Daicel-Evonik Ltd., polyimide P84 (registered trademark) NT2, average particle diameter: 15.9 μm)

Example 1

Producing of component (B)

35 parts by mass of TSR-400, 49 parts by mass of jER 807, 16 parts by mass of jER 604, and 2.8 parts by mass of E2020P were added to a planetary mixer. A jacket temperature of the planetary mixer was set as 140° C. to 160° C. and the raw materials were mixed until a homogeneous state is obtained. The mixture was cooled until the temperature of the content becomes a temperature equal to or lower than 60° C., and 40.6 parts by mass of SEIKACURE S was added to the planetary mixer. The jacket temperature was set to 55° C. to 70° C., the raw materials were mixed until a homogeneous state is obtained, and the component (B) was obtained.

(Producing of Mixture (BC))

12.3 parts by mass of VESTOSINT 2158 and 6.2 parts by mass of p84 were added to 143.4 parts by mass of the component (B) in the planetary mixture, a total content of VESTOSINT 2158 and p84 with respect to 100 parts by mass of the component (B) was 12.9 parts by mass, and a percentage of p84 occupying the total content of VESTOSINT 2158 and p84 was set as 33.5 mass %. The jacket temperature was set to 55° C. to 70° C., the raw materials were mixed until a homogeneous state is obtained, and a mixture (BC) was obtained.

(Producing of Prepreg)

The prepreg was produced by the method (δ).

The mixture (BC) was applied to a surface of released paper with a homogenous thickness by using a hot melt coater to produce the resin film (F3).

The resin film (F3) was bonded to both surfaces of the component (A) set to have a sheet shape by aligning a plurality of MR70, the component (B) was immersed in a constituent element (A) by using a fusing press device, the component (C) was filtered on the component (A), and the component (C) was unevenly distributed in the vicinity of the surface of the prepreg, to obtain the prepreg. A composition and a producing method of the prepreg are shown in Table 1.

(Producing of Fiber-Reinforced Composite Material and Evaluation)

The molding plate for evaluation was produced by the method described above. Regarding the molding plate for evaluation, the evaluation was performed. The result is shown in Table 1.

Example 2

Producing of component (B)

The component (B) was obtained in the same manner as in Example 1.

(Producing of Mixture (BC))

18.6 parts by mass of VESTOSINT 2158 and 9.3 parts by mass of p84 were added to 143.4 parts by mass of the component (B) in the planetary mixture, a total content of VESTOSINT 2158 and p84 with respect to 100 parts by mass of the component (B) was 19.5 parts by mass, and a percentage of p84 occupying the total content of VESTOSINT 2158 and p84 was set as 33.3 mass %. The jacket temperature was set to 55° C. to 70° C., the raw materials were mixed until a homogeneous state is obtained, and a mixture (BC) was obtained.

(Producing of Prepreg)

The prepreg was produced by the method (δ), in the same manner as in Example 1.

(Producing of Fiber-Reinforced Composite Material and Evaluation)

The molding plate for evaluation was produced and the evaluation was performed, in the same manner as in Example 1. The result is shown in Table 1.

Example 3

Producing of component (B)

The component (B) was obtained in the same manner as in Example 1.

(Producing of Mixture (BC))

14.3 parts by mass of VESTOSINT 2158 and 4.2 parts by mass of p84 were added to 143.4 parts by mass of the component (B) in the planetary mixture, a total content of VESTOSINT 2158 and p84 with respect to 100 parts by mass of the component (B) was 12.9 parts by mass, and a percentage of p84 occupying the total content of VESTOSINT 2158 and p84 was set as 22.7 mass %. The jacket temperature was set to 55° C. to 70° C., the raw materials were mixed until a homogeneous state is obtained, and a mixture (BC) was obtained.

(Producing of Prepreg)

The prepreg was produced by the method (δ), in the same manner as in Example 1.

(Producing of Fiber-Reinforced Composite Material and Evaluation)

The molding plate for evaluation was produced and the evaluation was performed, in the same manner as in Example 1. The result is shown in Table 1.

Example 4

Producing of component (B)

The component (B) was obtained in the same manner as in Example 1.

(Producing of Mixture (BC))

16.5 parts by mass of VESTOSINT 2158 and 2.0 parts by mass of p84 were added to 143.4 parts by mass of the component (B) in the planetary mixture, a total content of VESTOSINT 2158 and p84 with respect to 100 parts by mass of the component (B) was 12.9 parts by mass, and a percentage of p84 occupying the total content of VESTOSINT 2158 and p84 was set as 10.8 mass %. The jacket temperature was set to 55° C. to 70° C., the raw materials were mixed until a homogeneous state is obtained, and a mixture (BC) was obtained.

(Producing of Prepreg)

The prepreg was produced by the method (δ), in the same manner as in Example 1.

(Producing of Fiber-Reinforced Composite Material and Evaluation)

The molding plate for evaluation was produced and the evaluation was performed, in the same manner as in Example 1. The result is shown in Table 1.

Example 5

Producing of component (B)

The component (B) was obtained in the same manner as in Example 1.

(Producing of Mixture (BC))

12.3 parts by mass of VESTOSINT 2158 and 6.2 parts by mass of PIP-3 were added to 143.4 parts by mass of the component (B) in the planetary mixture, a total content of VESTOSINT 2158 and PIP-3 with respect to 100 parts by mass of the component (B) was 12.9 parts by mass, and a percentage of PIP-3 occupying the total content of VESTOSINT 2158 and PIP-3 was set as 33.5 mass %. The jacket temperature was set to 55° C. to 70° C., the raw materials were mixed until a homogeneous state is obtained, and a mixture (BC) was obtained.

(Producing of Prepreg)

The prepreg was produced by the method (b), in the same manner as in Example 1.

(Producing of Fiber-Reinforced Composite Material and Evaluation)

The molding plate for evaluation was produced and the evaluation was performed, in the same manner as in Example 1. The result is shown in Table 1.

Example 6

Producing of component (B)

The component (B) was obtained in the same manner as in Example 1.

(Producing of Mixture (BC))

12.3 parts by mass of VESTOSINT 2158 and 6.2 parts by mass of PIP-25 were added to 143.4 parts by mass of the component (B) in the planetary mixture, a total content of VESTOSINT 2158 and PIP-25 with respect to 100 parts by mass of the component (B) was 12.9 parts by mass, and a percentage of PIP-25 occupying the total content of VESTOSINT 2158 and PIP-25 was set as 33.5 mass %. The jacket temperature was set to 55° C. to 70° C., the raw materials were mixed until a homogeneous state is obtained, and a mixture (BC) was obtained.

(Producing of Prepreg)

The prepreg was produced by the method (6), in the same manner as in Example 1.

(Producing of Fiber-Reinforced Composite Material and Evaluation)

The molding plate for evaluation was produced and the evaluation was performed, in the same manner as in Example 1. The result is shown in Table 1.

Comparative Example 1

Producing of component (B)

The component (B) was obtained in the same manner as in Example 1.

(Producing of Mixture (BC'))

18.6 parts by mass of VESTOSINT 2158 was added to 143.4 parts by mass of the component (B) in the planetary mixture, and a content of VESTOSINT 2158 with respect to 100 parts by mass of the component (B) was 13.0 parts by mass. The jacket temperature was set to 55° C. to 70° C., the raw materials were mixed until a homogeneous state is obtained, and a mixture (BC') was obtained.

(Producing of Prepreg)

The prepreg was produced by the method (δ), in the same manner as in Example 1.

(Producing of Fiber-Reinforced Composite Material and Evaluation)

The molding plate for evaluation was produced and the evaluation was performed, in the same manner as in Example 1. The result is shown in Table 2.

Comparative Example 2

Producing of component (B)

The component (B) was obtained in the same manner as in Example 1.

(Producing of Mixture (BC'))

12.3 parts by mass of VESTOSINT 2158 and 6.2 parts by mass of P84NT1 were added to 143.4 parts by mass of the component (B) in the planetary mixture, a total content of VESTOSINT 2158 and P84NT1 with respect to 100 parts by mass of the component (B) was 12.9 parts by mass, and a percentage of P84NT1 occupying the total content of VESTOSINT 2158 and P84NT1 was set as 33.5 mass %. The jacket temperature was set to 55° C. to 70° C., the raw materials were mixed until a homogeneous state is obtained, and a mixture (BC') was obtained.

(Producing of Prepreg)

The prepreg was produced by the method (δ), in the same manner as in Example 1.

(Producing of Fiber-Reinforced Composite Material and Evaluation)

The molding plate for evaluation was produced and the evaluation was performed, in the same manner as in Example 1. The result is shown in Table 2.

Comparative Example 3

Producing of component (B)

The component (B) was obtained in the same manner as in Example 1.

(Producing of Mixture (BC'))

12.3 parts by mass of VESTOSINT 2158 and 6.2 parts by mass of P84NT2 were added to 143.4 parts by mass of the component (B) in the planetary mixture, a total content of VESTOSINT 2158 and P84NT2 with respect to 100 parts by mass of the component (B) was 12.9 parts by mass, and a percentage of P84NT2 occupying the total content of VESTOSINT 2158 and P84NT2 was set as 33.5 mass %. The jacket temperature was set to 55° C. to 70° C., the raw materials were mixed until a homogeneous state is obtained, and a mixture (BC') was obtained.

(Producing of Prepreg)

The prepreg was produced by the method (δ), in the same manner as in Example 1.

(Producing of Fiber-Reinforced Composite Material and Evaluation)

The molding plate for evaluation was produced and the evaluation was performed, in the same manner as in Example 1. The result is shown in Table 2.

Comparative Example 4

Producing of component (B)

The component (B) was obtained in the same manner as in Example 1.

(Producing of Mixture (BC'))

18.6 parts by mass of P84 was added to 143.4 parts by mass of the component (B) in the planetary mixture, and a total content of P84 with respect to 100 parts by mass of the component (B) was 13.0 parts by mass. The jacket temperature was set to 55° C. to 70° C., the raw materials were mixed until a homogeneous state is obtained, and a mixture (BC') was obtained.

(Producing of Prepreg)

The prepreg was produced by the method (6), in the same manner as in Example 1.

(Producing of Fiber-Reinforced Composite Material and Evaluation)

The molding plate for evaluation was produced and the evaluation was performed, in the same manner as in Example 1. The result is shown in Table 2.

TABLE 1

|  |  |  | Example 1 | | Example 2 | | Example 3 | |
| --- | --- | --- | --- | --- | --- | --- | --- | --- |
| Component (A) | | MR70 | Used | | Used | | Used | |
| Component (B) | Epoxy resin | TSR-400 | 35 | | 35 | | 35 | |
|  |  | jER807 | 49 | | 49 | | 49 | |
|  |  | jER604 | 16 | | 16 | | 16 | |
|  | Epoxy resin curing agent | SEIKACURE S | 40.6 | | 40.6 | | 40.6 | |
|  | Random component | E2020P | 2.8 | | 2.8 | | 2.8 | |
| Component (c1) | Polyamide particles | VESTOSINT2158 | 12.3 | | 18.6 | | 14.3 | |
|  | Thermosetting polyimide particles | p84 | 6.2 | | 9.3 | | 4.2 | |
|  |  | PIP-3 | 0 | | 0 | | 0 | |
|  |  | PIP-25 | 0 | | 0 | | 0 | |
| Resin particles not included in component (c1) | | p84NT1 | 0 | | 0 | | 0 | |
|  |  | p84NT2 | 0 | | 0 | | 0 | |
| Total content of component (c1) with respect to 100 parts by mass of component (B) | | (parts by mass) | 12.9 | | 19.5 | | 12.9 | |
| Percentage of thermosetting polyimide particles occupying total content of component (c1) | | (mass %) | 33.5 | | 33.3 | | 22.7 | |
| Prepreg | FAW of prepreg | (g/m$^2$) | 190 | | 190 | | 190 | |
|  | Resin content of prepreg (component (C) is exposed as a part of matrix resin) | (wt %) | 34 | | 34 | | 34 | |
|  | Resin particle content of prepreg | (g/m$^2$) | 11.0 | | 11.0 | | 11.0 | |
|  | Producing of prepreg |  | 2 paper | | 2 paper | | 2 paper | |
| Molding conditions | Curing temperature | (° C.) | 180 | 180 | 180 | 180 | 180 | 180 |
|  | Rate of temperature increase | (° C./min) | 2.0 | 0.5 | 2.0 | 0.5 | 2.0 | 0.5 |
| Evaluation of fiber-reinforced composite material | Uneven distribution rate | (%) | 93.6 | 94.5 | 95.5 | 92.1 | 96.3 | 95.8 |
|  | GIC (mode I interlayer toughness value) | (kJ/m$^2$) | 1.01 | 0.56 | 1.16 | 0.55 | 1.08 | 0.50 |
|  | GIIC (mode II interlayer toughness value) | (kJ/m$^2$) | 2.5 | 2.0 | 2.9 | 2.4 | 2.8 | 1.8 |

|  |  |  | Example 4 | | Example 5 | | Example 6 | |
| --- | --- | --- | --- | --- | --- | --- | --- | --- |
| Component (A) | | MR70 | Used | | Used | | Used | |
| Component (B) | Epoxy resin | TSR-400 | 35 | | 35 | | 35 | |
|  |  | jER807 | 49 | | 49 | | 49 | |
|  |  | jER604 | 16 | | 16 | | 16 | |
|  | Epoxy resin curing agent | SEIKACURE S | 40.6 | | 40.6 | | 40.6 | |
|  | Random component | E2020P | 2.8 | | 2.8 | | 2.8 | |
| Component (c1) | Polyamide particles | VESTOSINT2158 | 16.5 | | 12.3 | | 12.3 | |
|  | Thermosetting polyimide particles | p84 | 2.0 | | 0 | | 0 | |
|  |  | PIP-3 | 0 | | 6.2 | | 0 | |
|  |  | PIP-25 | 0 | | 0 | | 6.2 | |
| Resin particles not included in component (c1) | | p84NT1 | 0 | | 0 | | 0 | |
|  |  | p84NT2 | 0 | | 0 | | 0 | |
| Total content of component (c1) with respect to 100 parts by mass of component (B) | | (parts by mass) | 12.9 | | 12.9 | | 12.9 | |
| Percentage of thermosetting polyimide particles occupying total content of component (c1) | | (mass %) | 10.8 | | 33.5 | | 33.5 | |
| Prepreg | FAW of prepreg | (g/m$^2$) | 190 | | 190 | | 190 | |
|  | Resin content of prepreg (component (C) is exposed as a part of matrix resin) | (wt %) | 34 | | 34 | | 34 | |
|  | Resin particle content of prepreg | (g/m$^2$) | 11.0 | | 11.0 | | 11.0 | |
|  | Producing of prepreg |  | 2 paper | | 2 paper | | 2 paper | |
| Molding conditions | Curing temperature | (° C.) | 180 | 180 | 180 | 180 | 180 | 180 |
|  | Rate of temperature increase | (° C./min) | 2.0 | 0.5 | 2.0 | 0.5 | 2.0 | 0.5 |
| Evaluation of fiber-reinforced composite material | Uneven distribution rate | (%) | 93.4 | 92.7 | 90.2 | 88.9 | 92.3 | 93.9 |
|  | GIC (mode I interlayer toughness value) | (kJ/m$^2$) | 1.09 | 0.52 | 0.87 | 0.58 | 0.89 | 0.55 |
|  | GIIC (mode II interlayer toughness value) | (kJ/m$^2$) | 2.8 | 1.1 | 2.2 | 1.5 | 2.9 | 1.8 |

TABLE 2

|  |  |  | Comparative Example 1 | Comparative Example 2 | Comparative Example 3 | Comparative Example 4 |
| --- | --- | --- | --- | --- | --- | --- |
| Component (A) | | MR70 | Used | Used | Used | Used |
| Component (B) | Epoxy resin | TSR-400 | 35 | 35 | 35 | 35 |
|  |  | jER807 | 49 | 49 | 49 | 49 |
|  |  | jER604 | 16 | 16 | 16 | 16 |
|  | Epoxy resin curing agent | SEIKACURE S | 40.6 | 40.6 | 40.6 | 40.6 |
|  | Random component | E2020P | 2.8 | 2.8 | 2.8 | 2.8 |

TABLE 2-continued

|  |  |  | Comparative Example 1 | Comparative Example 2 | Comparative Example 3 | Comparative Example 4 |
|---|---|---|---|---|---|---|
| Component (c1) | Polyamide particles | VESTOSINT2158 | 18.6 | 12.3 | 12.3 | 0 |
|  | Thermosetting polyimide particles | p84 | 0 | 0 | 0 | 18.6 |
|  |  | PIP-3 | 0 | 0 | 0 | 0 |
|  |  | PIP-25 | 0 | 0 | 0 | 0 |
| Resin particles not included in component (c1) |  | p84NT1 | 0 | 6.2 | 0 | 0 |
|  |  | p84NT2 | 0 | 0 | 6.2 | 0 |
| Total content of component (c1) with respect to 100 parts by mass of component (B) |  | (parts by mass) | 13.0 | 8.6 | 8.6 | 13.0 |
| Percentage of thermosetting polyimide particles occupying total content of component (c1) |  | (mass %) | 0.0 | 0.0 | 0.0 | 100.0 |
| Prepreg | FAW of prepreg | (g/m$^2$) | 190 | 190 | 190 | 190 |
|  | Resin content of prepreg (component (C) is exposed as a part of matrix resin) | (wt %) | 34 | 34 | 34 | 34 |
|  | Resin particle content of prepreg | (g/m$^2$) | 11.0 | 11.0 | 11.0 | 11.0 |
|  | Producing of prepreg |  | 2 paper | 2 paper | 2 paper | 2 paper |
| Molding conditions | Curing temperature | (° C.) | 180  180 | 180  180 | 180  180 | 180  180 |
|  | Rate of temperature increase | (° C./min) | 2.0  0.5 | 2.0  0.5 | 2.0  0.5 | 2.0  0.5 |
| Evaluation of fiber-reinforced composite material | Uneven distribution rate | (%) | 95.3  94.2 | 88.3  87.2 | 90.1  88.9 | 90.1  88.9 |
|  | GIC (mode I interlayer toughness value) | (kJ/m$^2$) | 0.73  0.39 | 0.57  0.51 | 0.57  0.54 | 0.38  0.31 |
|  | GIIC (mode II interlayer toughness value) | (kJ/m$^2$) | 2.8  0.7 | 1.5  0.6 | 1.6  0.8 | 2.1  1.8 |

TABLE 3

|  |  |  | Average particle diameter (μm) |
|---|---|---|---|
| Component (c1) | Polyamide particles | VESTOSINT2158 | 20.5 |
|  | Thermosetting polyimide particles | p84 | 17.7 |
|  |  | PIP-3 | 2.8 |
|  |  | PIP-25 | 12.9 |
| Resin particles not included in component (c1) |  | p84NT1 | 8.9 |
|  |  | p84NT2 | 15.9 |

The fiber-reinforced composite materials of Examples 1 to 6 show GIIc equal to or greater than 1.0 kJ/m$^2$ under any molding conditions of 2.0° C./min and 0.5° C./min, and have excellent mode II interlayer fracture toughness. Meanwhile, the fiber-reinforced composite materials of Comparative Examples 1 to 3 not including the thermosetting polyimide particles show GIIc lower than 1.0 kJ/m$^2$ under the molding condition of 0.5° C./min, and the mode II interlayer fracture toughness was deteriorated. In addition, in Comparative Example 4 only including the thermosetting polyimide particles, a low value smaller than 1.0 kJ/m$^2$ was obtained under any molding conditions of 2.0° C./min and 0.5° C./min.

In comparison between Example 1 and Example 2, a higher GIIc is shown in Example 2 in which a larger amount of the component (C) is included. From a viewpoint of exhibiting excellent mode 11 interlayer fracture toughness, a total content of the component (C) with respect to 100 parts by mass of the component (B) is more preferable in Example 2.

In comparison between Example 1 and Examples 3 and 4, the GIIc under the molding condition of 0.5° C./min becomes higher in the order of Example 4, Example 3, and Example 1. In a combination of component (A) to component (C) of these examples, a percentage of the thermosetting polyimide particles occupying the component (C) ((c1) polyamide particles and the thermosetting polyimide particles) is preferable in Example 3 than Example 4, and preferable in Example 1 than Example 3.

Since the fiber-reinforced composite material having stable and excellent mold I interlayer fracture toughness and the mode II interlayer fracture toughness regardless of the producing conditions, the fiber-reinforced composite material obtained by the producing method of the fiber-reinforced composite material of the invention is useful for sport • leisure, automobiles, other general industries (tension material), in addition to aeroplane.

Raw Materials
(Component (A))
(Bunch of Reinforced Fibers)
MR70: bunch of carbon fibers (manufactured by Mitsubishi Chemical Corporation, PYROFIL (registered trademark) MR70 12P, strand strength: 7000 MPa, fiber diameter of carbon fiber: 5 μm, number of carbon fibers: 12000)
(Component (B))
(Epoxy Resin)
TSR-400: epoxy resin having an oxazolidone ring structure (manufactured by DIC Corporation, EPICLON TSR-400)
jER 807: liquid bisphenol F type epoxy resin (manufactured by Mitsubishi Chemical Corporation, jER (registered trademark) 807)
jER 604: Diaminodiphenylmethane semisolid type epoxy resin (manufactured by Mitsubishi Chemical Corporation, jER (registered trademark) 604)
(Curing Agent)
SEIKACURE S: 4,4'-diaminodiphenyl sulfone (manufactured by SEIKA CORPORATION, SEIKACURE S)

(Random Component)

E2020P: polyether sulfone (manufactured by BASF Japan, ULTRASON (registered trademark) E2020 P SR MICRO)

(Component (C))

(Polyamide particles of component (c2))

MW-330: spherical copolymer polyamide particles (manufactured by SC Environmental Science Co., Ltd., MW-330, melting point: 166° C., average particle diameter: 8 μm, average value of short diameter/long diameter: 0.96)

Thermosetting Polyimide Particles Capable of Being Included in component (c2)

p84: thermosetting polyimide particles (manufactured by HP Polymer, P84 (registered trademark) Polyimide, average particle diameter: 18 μm)

(Resin Particles Not Included in component (C))

VESTOSINT 2158: non-spherical polyamide 12 particles (manufactured by Daicel-Evonik Ltd., VESTOSINT (registered trademark) 2158 natural, melting point: 177° C., average particle diameter: 21 μm, average value of short diameter/long diameter: 0.65)

Ny12 Particles A: spherical polyamide 12 particles (melting point: 177° C., average particle diameter: 21 μm, average value of short diameter/long diameter: 0.94)

TR55: spherical amorphous polyamide particles (GRILAMID (registered trademark) TR55 manufactured by EMS-CHEMIE (Japan) Ltd., melting point: 160° C., average particle diameter: 10 μm, average value of short diameter/long diameter: 0.91)

Producing of Ny 12 Particles A

The spherical polyamide 12 particles were produced by a producing method of spherical polyamide disclosed in Japanese Unexamined Patent Application, First Publication No. H10-316750.

Example 7

Producing of component (B)

35 parts by mass of TSR-400, 49 parts by mass of jER 807, 16 parts by mass of jER 604, and 2.8 parts by mass of E2020P were added to a planetary mixer. A jacket temperature of the planetary mixer was set as 140° C. to 160° C. and the raw materials were mixed until a homogeneous state is obtained. The mixture was cooled until the temperature of the content becomes a temperature equal to or lower than 60° C., and 40.6 parts by mass of SEIKACURE S was added to the planetary mixer. The jacket temperature was set to 55° C. to 70° C., the raw materials were mixed until a homogeneous state is obtained, and the component (B) was obtained.

(Producing of Mixture (BC))

37.2 parts by mass of MW-330 was added to 143.4 parts by mass of the component (B) in the planetary mixture, and a content of MW-330 with respect to 100 parts by mass of the component (B) was 25.9 parts by mass. The jacket temperature was set to 55° C. to 70° C., the raw materials were mixed until a homogeneous state is obtained, and a mixture (BC) was obtained.

(Producing of Prepreg)

The prepreg was produced by the method (γ).

The component (B) and the mixture (BC) were respectively applied to a surface of released paper with a homogenous thickness by using a hot melt coater to produce the resin films (F1) and (F3).

The resin film (F1) was bonded to both surfaces of the component (A) set to have a sheet shape by aligning a plurality of MR70, the component (B) was immersed in the component (A) by using a fusing press device, to produce the base prepreg (P1), and the resin film (F3) was further bonded to both surfaces of the base prepreg (P1) to obtain the prepreg. A content of the component (C) with respect to 100 parts by mass of the component (B) of the obtained prepreg is 13.0 parts by mass. A composition and a producing method of the prepreg are shown in Table 4.

(Producing of Fiber-Reinforced Composite Material and Evaluation)

The molding plate for evaluation was produced by the method described above. Regarding the molding plate for evaluation, the evaluation was performed. The result is shown in Table 4.

Example 8

Producing of component (B)

The component (B) was obtained in the same manner as in Example 1.

(Producing of Mixture (BC))

33.0 parts by mass of MW-330 and 4.0 parts by mass of p84 were added to 143.4 parts by mass of the component (B) in the planetary mixture, and a total content of MW-330 and p84 with respect to 100 parts by mass of the component (B) was 12.9 parts by mass. The jacket temperature was set to 55° C. to 70° C., the raw materials were mixed until a homogeneous state is obtained, and a mixture (BC) was obtained.

(Producing of Prepreg)

The prepreg was produced by the method (γ), in the same manner as in Example 7. A content of the component (C) with respect to 100 parts by mass of the component (B) of the obtained prepreg is 12.9 parts by mass. A composition and a producing method of the prepreg are shown in Table 4.

(Producing of Fiber-Reinforced Composite Material and Evaluation)

The molding plate for evaluation was produced and the evaluation was performed, in the same manner as in Example 7. The result is shown in Table 4.

Comparative Example 5

Producing of component (B)

The component (B) was obtained in the same manner as in Example 7.

(Producing of Mixture (BC'))

18.6 parts by mass of VESTOSINT 2158 was added to 143.4 parts by mass of the component (B) in the planetary mixture, and a content of VESTOSINT 2158 with respect to 100 parts by mass of the component (B) was 13.0 parts by mass. The jacket temperature was set to 55° C. to 70° C., the raw materials were mixed until a homogeneous state is obtained, and a mixture (BC') was obtained.

Producing of Prepreg

The prepreg was produced by the method (δ).

The mixture (BC') was applied to a surface of released paper with a homogenous thickness by using a hot melt coater to produce the resin film (F3).

The resin film (F3) was bonded to both surfaces of the component (A) set to have a sheet shape by aligning a plurality of MR70, the component (B) was immersed in a constituent element (A) by using a fusing press device, VESTOSINT 2158 was filtered on the component (A), and VESTOSINT 2158 was unevenly distributed in the vicinity of the surface of the prepreg, to obtain the prepreg. A content of VESTOSINT 2158 with respect to 100 parts by mass of the component (B) of the obtained prepreg is 13.0 parts by mass. A composition and a producing method of the prepreg are shown in Table 4.

(Producing of Fiber-Reinforced Composite Material and Evaluation)

The molding plate for evaluation was produced and the evaluation was performed, in the same manner as in Example 7. The result is shown in Table 4.

Comparative Example 6

Producing of component (B)

The component (B) was obtained in the same manner as in Example 7.

(Producing of Mixture (BC'))

12.3 parts by mass of VESTOSINT 2158 6.2 parts by mass of p84 were added to 143.4 parts by mass of the component (B) in the planetary mixture, and a total content of VESTOSINT 2158 and p84 with respect to 100 parts by mass of the component (B) was 12.9 parts by mass. The jacket temperature was set to 55° C. to 70° C., the raw materials were mixed until a homogeneous state is obtained, and a mixture (BC') was obtained.

(Producing of Prepreg)

The prepreg was produced by the method (6).

The mixture (BC') was applied to a surface of released paper with a homogenous thickness by using a hot melt coater to produce the resin film (F3).

The resin film (F3) was bonded to both surfaces of the component (A) set to have a sheet shape by aligning a plurality of MR70, the component (B) was immersed in a constituent element (A) by using a fusing press device, VESTOSINT 2158 and p84 were filtered on the component (A), and VESTOSINT 2158 and p84 were unevenly distributed in the vicinity of the surface of the prepreg, to obtain the prepreg. A total content of VESTOSINT 2158 and p84 with respect to 100 parts by mass of the component (B) of the obtained prepreg is 12.9 parts by mass. A composition and a producing method of the prepreg are shown in Table 4.

(Producing of Fiber-Reinforced Composite Material and Evaluation)

The molding plate for evaluation was produced and the evaluation was performed, in the same manner as in Example 7. The result is shown in Table 4.

Comparative Example 7

Producing of component (B)

The component (B) was obtained in the same manner as in Example 7.

(Producing of Mixture (BC'))

18.6 parts by mass of Ny 12 particles A was added to 143.4 parts by mass of the component (B) in the planetary mixture, and a content of Ny 12 particles A with respect to 100 parts by mass of the component (B) was 13.0 parts by mass. The jacket temperature was set to 55° C. to 70° C., the raw materials were mixed until a homogeneous state is obtained, and a mixture (BC') was obtained.

(Producing of Prepreg)

The prepreg was produced by the method (δ).

The mixture (BC') was applied to a surface of released paper with a homogenous thickness by using a hot melt coater to produce the resin film (F3).

The resin film (F3) was bonded to both surfaces of the component (A) set to have a sheet shape by aligning a plurality of MR70, the component (B) was immersed in a constituent element (A) by using a fusing press device, Ny 12 particles A was filtered on the component (A), and Ny 12 particles A was unevenly distributed in the vicinity of the surface of the prepreg, to obtain the prepreg. A content of Ny 12 particles A with respect to 100 parts by mass of the component (B) of the obtained prepreg is 12.9 parts by mass. A composition and a producing method of the prepreg are shown in Table 4.

(Producing of Fiber-Reinforced Composite Material and Evaluation)

The molding plate for evaluation was produced and the evaluation was performed, in the same manner as in Example 7. The result is shown in Table 4.

Comparative Example 8

Producing of component (B)

The component (B) was obtained in the same manner as in Example 7.

Producing of Mixture (BC')

18.6 parts by mass of TR55 was added to 143.4 parts by mass of the component (B) in the planetary mixture, and a content of TR55 with respect to 100 parts by mass of the component (B) was 13.0 parts by mass. The jacket temperature was set to 55° C. to 70° C., the raw materials were mixed until a homogeneous state is obtained, and a mixture (BC') was obtained.

(Producing of Prepreg)

The prepreg was produced by the method (δ).

The mixture (BC') was applied to a surface of released paper with a homogenous thickness by using a hot melt coater to produce the resin film (F3).

The resin film (F3) was bonded to both surfaces of the component (A) set to have a sheet shape by aligning a plurality of MR70, the component (B) was immersed in a constituent element (A) by using a fusing press device, TR55 was filtered on the component (A), and TR55 was unevenly distributed in the vicinity of the surface of the prepreg, to obtain the prepreg. A content of TR55 with respect to 100 parts by mass of the component (B) of the obtained prepreg is 13.0 parts by mass. A composition and a producing method of the prepreg are shown in Table 4.

(Producing of Fiber-Reinforced Composite Material and Evaluation)

The molding plate for evaluation was produced and the evaluation was performed, in the same manner as in Example 7. The result is shown in Table 4.

TABLE 4

|  |  |  | Example 7 | Example 8 | Comparative Example 5 |
|---|---|---|---|---|---|
| Component (A) |  | MR70 | Used | Used | Used |
| Component (B) | Epoxy resin | TSR-400 | 35 | 35 | 35 |
|  |  | jER807 | 49 | 49 | 49 |
|  |  | jER604 | 16 | 16 | 16 |
|  | Epoxy resin curing agent | SEIKACURE S | 40.6 | 40.6 | 40.6 |
|  | Random component | E2020P | 2.8 | 2.8 | 2.8 |

TABLE 4-continued

| Component (c2) | Spherical polyamide particles | MW-330 | 18.6 | 16.5 | 0 |
|---|---|---|---|---|---|
| | Thermosetting polyimide particles | p84 | 0 | 2 | 0 |
| Resin particles not included in component (c2) | | VESTOSINT2158 | 0 | 0 | 18.6 |
| | | Ny 12 particles A | 0 | 0 | 0 |
| | | TR55 | 0 | 0 | 0 |
| Total content of component (c2) with respect to 100 parts by mass of component (B) | | (parts by mass) | 13.0 | 12.9 | 0.0 |
| Percentage of thermosetting polyimide particles occupying total content of component (c2) | | (mass %) | 0.0 | 10.8 | 0.0 |
| Prepreg | FAW of prepreg | (g/m²) | 190 | 190 | 190 |
| | Resin content of prepreg (component (C) is exposed as a part of matrix resin) | (wt %) | 34 | 34 | 34 |
| | Resin particle content of prepreg | (g/m²) | 11.0 | 11.0 | 11.0 |
| | Producing of prepreg | | γ | γ | δ |
| Molding conditions | Curing temperature | (° C.) | 180  180 | 180  180 | 180  180 |
| | Rate of temperature increase | (° C./min) | 2.0  0.5 | 2.0  0.5 | 2.0  0.5 |
| Evaluation of fiber-reinforced composite material | GIC (mode I interlayer toughness value) | (kJ/m²) | 1.67  0.73 | 1.31  0.76 | 0.73  0.39 |
| | GIIC (mode II interlayer toughness value) | (kJ/m²) | 3.30  2.98 | 2.88  2.54 | 2.77  0.71 |

| | | | Comparative Example 6 | Comparative Example 7 | Comparative Example 8 |
|---|---|---|---|---|---|
| Component (A) | | MR70 | Used | Used | Used |
| Component (B) | Epoxy resin | TSR-400 | 35 | 35 | 35 |
| | | jER807 | 49 | 49 | 49 |
| | | jER604 | 16 | 16 | 16 |
| | Epoxy resin curing agent | SEIKACURE S | 40.6 | 40.6 | 40.6 |
| | Random component | E2020P | 2.8 | 2.8 | 2.8 |
| Component (c2) | Spherical polyamide particles | MW-330 | 0 | 0 | 0 |
| | Thermosetting polyimide particles | p84 | 6.2 | 0.0 | 0.0 |
| Resin particles not included in component (c2) | | VESTOSINT2158 | 12.3 | 0 | 0 |
| | | Ny 12 particles A | 0 | 18.6 | 0 |
| | | TR55 | 0 | 0 | 18.6 |
| Total content of component (c2) with respect to 100 parts by mass of component (B) | | (parts by mass) | 4.3 | 0.0 | 0.0 |
| Percentage of thermosetting polyimide particles occupying total content of component (c2) | | (mass %) | 0.0 | 0.0 | 0.0 |
| Prepreg | FAW of prepreg | (g/m²) | 190 | 190 | 190 |
| | Resin content of prepreg (component (C) is exposed as a part of matrix resin) | (wt %) | 34 | 34 | 34 |
| | Resin particle content of prepreg | (g/m²) | 11.0 | 11.0 | 11.0 |
| | Producing of prepreg | | δ | δ | δ |
| Molding conditions | Curing temperature | (° C.) | 180  180 | 180  180 | 180  180 |
| | Rate of temperature increase | (° C./min) | 2.0  0.5 | 2.0  0.5 | 2.0  0.5 |
| Evaluation of fiber-reinforced composite material | GIC (mode I interlayer toughness value) | (kJ/m²) | 1.01  0.56 | 2.09  0.64 | 0.54  0.53 |
| | GIIC (mode II interlayer toughness value) | (kJ/m²) | 2.45  2.03 | 2.30  0.97 | 1.74  1.09 |

The fiber-reinforced composite materials of Examples 7 and 8 show GIc equal to or greater than 0.7 kJ/m² under any molding conditions of 2.0° C./min and 0.5° C./min, show GIIc equal to or greater than 1.5 kJ/m², and have stable and excellent interlayer fracture toughness. Meanwhile, the fiber-reinforced composite materials of Comparative Examples 5 to 8 not including the component (C) show significantly deteriorated GIc or GIIc under the molding condition of 0.5° C./min, and unstable interlayer fracture toughness was obtained.

In comparison between Example 7 and Example 8, in Example 8 including the thermosetting polyimide particles capable of being included in the component (c2) (thermosetting polyimide particles capable of being used with the spherical polyamide particles having a melting point of 140° C. to 175° C. of component (c2) as the component (C)), a difference of GIc or GIIc due to the molding condition further decreases, and more stable interlayer fracture toughness was shown.

In comparison between Examples 5 and 6, by setting the shape of the rein particles present in the surface of the prepreg as a sphere, high GIc was shown even under the molding condition of 0.5° C./min, and GIIc greatly decreases under the molding condition of 0.5° C./min. In Example 1 in which the resin particles present in the surface of the prepreg have a spherical shape and the material thereof is copolymer polyamide having a lower melting point, high GIc or GIIc was shown even under the molding condition of 0.5° C./min.

Physical Properties • Evaluation (Producing of Molding Plate for Evaluation of Glass Transition Temperature Comprising Fiber-Reinforced Composite Material)

12 sheets of prepregs were laminated so that a fiber axial direction of the reinforced fiber is aligned. A vacuum bag was covered over the laminated prepreg without gaps. The laminated prepreg was heated from room temperature to 180° C. at a rate of temperature increase of 2° C./min using the autoclave and the temperature was maintained for 2 hours. The laminated prepreg was maintained in the autoclave until the temperature becomes equal to or lower than 50° C. at a rate of temperature decrease of 3° C./min. A molding plate for evaluation was extracted from the autoclave. A pressure in the autoclave was set as 0.6 MPa from the start of the heating to the extraction.

(Measurement of Glass Transition Temperature)

Regarding the molding plate for evaluation of the glass transition temperature, a glass transition temperature was measured based on ASTM D4065 using ARES-RDA (TA Instruments). A size of a test body for measurement, in which a temperature at an intersection of a tangent in a glass state and a tangent at an inflection point in a transition state of a storage modulus G' curved was set as a glass transition temperature, has a length in a fiber axial direction of the reinforced fiber of 55 mm, and a width perpendicular to the fiber axial direction of the reinforced fiber of 12.7 mm A rate of temperature decrease was set 5° C./min and a frequency was 1 Hz. The test body for measurement was immersed in warm water at 71° C. for 2 weeks before the measurement, to perform a moisture absorption treatment.

Raw Material (Component (A))

(Bunch of Reinforced Fibers)

MR70: bunch of carbon fibers (manufactured by Mitsubishi Chemical Corporation, PYROFIL (registered trademark) MR70 12P, strand strength: 7000 MPa, fiber diameter of carbon fiber: 5 μm, number of carbon fibers: 12000)

(Component (B))

(Epoxy Resin)

TSR-400: epoxy resin having an oxazolidone ring structure (manufactured by DIC Corporation, EPICLON (registered trademark) TSR-400)

HP-4032SS: difunctional naphthalene type epoxy resin (manufactured by DIC Corporation, EPICLON (registered trademark) HP-4032SS)

HP-4700: tetra-functional naphthalene type epoxy resin (manufactured by DIC Corporation, EPICLON (registered trademark) HP-4700)

jER 807: liquid bisphenol F type epoxy resin (manufactured by Mitsubishi Chemical Corporation, jER (registered trademark) 807)

jER 604: Diaminodiphenylmethane semisolid type epoxy resin (manufactured by Mitsubishi Chemical Corporation, jER (registered trademark) 604)

(Curing Agent)

SEIKACURE S: 4,4'-diaminodiphenyl sulfone (manufactured by SEIKA CORPORATION, SEIKACURE S)

(Random Component)

E2020P: polyether sulfone (manufactured by BASF Japan, ULTRASON (registered trademark) E2020 P SR MICRO)

(Component (C))

(Polyimide particles of component (c2))

MW-330: spherical copolymer polyamide particles (manufactured by SC Environmental Science Co., Ltd., MW-330, melting point: 166° C., average particle diameter: 8 μm, average value of short diameter/long diameter: 0.96)

Thermosetting Polyimide Particles Capable of Being Included in component (c2)

p84: thermosetting polyimide particles (manufactured by HP Polymer, P84 (registered trademark) Polyimide, average particle diameter: 18 μm)

Example 9

Producing of component (B)

35 parts by mass of TSR-400, 65 parts by mass of HP-4032SS, and 2.8 parts by mass of E2020P were added to a planetary mixer. A jacket temperature of the planetary mixer was set as 140° C. to 160° C. and the raw materials were mixed until a homogeneous state is obtained. The mixture was cooled until the temperature of the content becomes a temperature equal to or lower than 60° C., and 43 parts by mass of SEIKACURE S was added to the planetary mixer. The jacket temperature was set to 55° C. to 70° C., the raw materials were mixed until a homogeneous state is obtained, and the component (B) was obtained.

(Producing of Mixture (BC))

43.3 parts by mass of MW-330 was added to 145.8 parts by mass of the component (B) in the planetary mixture. The jacket temperature was set to 55° C. to 70° C., the raw materials were mixed until a homogeneous state is obtained, and a mixture (BC) was obtained.

(Producing of Prepreg)

The prepreg was produced by the method (γ).

The component (B) and the mixture (BC) were respectively applied to a surface of released paper with a homogenous thickness by using a hot melt coater to produce the resin films (F1) and (F3).

The resin film (F1) was bonded to both surfaces of the component (A) set to have a sheet shape by aligning a plurality of MR70, the component (B) was immersed in the component (A) by using a fusing press device, to produce the base prepreg (P1), and the resin film (F3) was further bonded to both surfaces of the base prepreg (P1) to obtain the prepreg. A total content of the component (C) with respect to 100 parts by mass of the component (B) of the obtained prepreg is 13.0 parts by mass. A composition and a producing method of the prepreg are shown in Table 5.

(Producing of Fiber-Reinforced Composite Material and Evaluation)

The molding plate for evaluation was produced by the method described above. Regarding the molding plate for evaluation, the evaluation was performed. The result is shown in Table 5.

Example 10

Producing of component (B)

The component (B) was obtained in the same manner as in Example 9.

(Producing of Mixture (BC'))

38.6 parts by mass of MW-330 and 4.7 parts by mass of p84 were added to 143.4 parts by mass of the component (B) in the planetary mixture. The jacket temperature was set to 55° C. to 70° C., the raw materials were mixed until a homogeneous state is obtained, and a mixture (BC') was obtained.

(Producing of Prepreg)

The component (B) and the mixture (BC') were respectively applied to a surface of released paper with a homogenous thickness by using a hot melt coater to produce the resin films (F1) and (F3).

The resin film (F1) was bonded to both surfaces of the component (A) set to have a sheet shape by aligning a plurality of MR70, the component (B) was immersed in the component (A) by using a fusing press device, to produce the base prepreg (P1), and the resin film (F3) was further bonded to both surfaces of the base prepreg (P1) to obtain the prepreg. A total content of the constituent element component (c2) with respect to 100 parts by mass of the component (B) of the obtained prepreg is 13.0 parts by mass. A composition and a producing method of the prepreg are shown in Table 5.

(Producing of Fiber-Reinforced Composite Material and Evaluation)

The molding plate for evaluation was produced and the evaluation was performed, in the same manner as in Example 9. The result is shown in Table 5.

Example 11

Producing of component (B)

35 parts by mass of HP-4700, 65 parts by mass of HP-4032SS, and 2.8 parts by mass of E2020P were added in a planetary mixture. A jacket temperature of the planetary mixer was set as 140° C. to 160° C. and the raw materials were mixed until a homogeneous state is obtained. The mixture was cooled until the temperature of the content becomes a temperature equal to or lower than 60° C., and 51.5 parts by mass of SETKACURE S was added to the planetary mixer. The jacket temperature was set to 55° C. to 70° C., the raw materials were mixed until a homogeneous state is obtained, and the component (B) was obtained.

(Producing of Mixture (BC))

45.9 parts by mass of MW-330 was added to 154.3 parts by mass of the component (B) in the planetary mixture. The jacket temperature was set to 55° C. to 70° C., the raw materials were mixed until a homogeneous state is obtained, and a mixture (BC) was obtained.

(Producing of Prepreg)

The prepreg was produced by the method (γ).

The prepreg was produced by the method (γ), in the same manner as in Example 9. A total content of the component (C) with respect to 100 parts by mass of the component (B) of the obtained prepreg is 13.0 parts by mass. A composition and a producing method of the prepreg are shown in Table 5.

(Producing of Fiber-Reinforced Composite Material and Evaluation)

The molding plate for evaluation was produced by the method described above. Regarding the molding plate for evaluation, the evaluation was performed. The result is shown in Table 5.

Example 12

Producing of component (B)

The component (B) was obtained in the same manner as in Example 11.

(Producing of Mixture (BC'))

35.4 parts by mass of MW-330 and 10.5 parts by mass of p84 were added to 154.3 parts by mass of the component (B) in the planetary mixture. The jacket temperature was set to 55° C. to 70° C., the raw materials were mixed until a homogeneous state is obtained, and a mixture (BC') was obtained.

(Producing of Prepreg)

The prepreg was produced by the method (γ), in the same manner as in Example 10. A total content of the constituent element component (c2) with respect to 100 parts by mass of the component (B) of the obtained prepreg is 13.0 parts by mass. A composition and a producing method of the prepreg are shown in Table 5.

(Producing of Fiber-Reinforced Composite Material and Evaluation)

The molding plate for evaluation was produced and the evaluation was performed, in the same manner as in Example 9. The result is shown in Table 5.

TABLE 5

|  |  |  |  | Example 9 | Example 10 | Example 11 | Example 12 |
|---|---|---|---|---|---|---|---|
| Component (A) |  | MR70 |  | Used | Used | Used | Used |
| Component (B) | Epoxy resin | TSR-400 |  | 35 | 35 | 0 | 0 |
|  |  | HP-4032SS |  | 65 | 65 | 65 | 65 |
|  |  | HP-4700 |  | 0 | 0 | 35 | 35 |
|  |  | jER807 |  | 0 | 0 | 0 | 0 |
|  |  | jER604 |  | 0 | 0 | 0 | 0 |
|  | Epoxy resin curing agent | SEIKACURE S |  | 43 | 43 | 51.5 | 51.5 |
|  | Random component | E2020P |  | 2.8 | 2.8 | 2.8 | 2.8 |
| Component (c2) | Spherical polyamide particles | MW-330 |  | 18.9 | 16.8 | 20 | 15.4 |
|  | Thermosetting polyimide particles | p84 |  | 0 | 2.1 | 0 | 4.6 |
| Total content of component (c2) with respect to 100 parts by mass of component (B) |  |  | (parts by mass) | 13.0 | 13.0 | 13.0 | 13.0 |
| Prepreg |  | FAW of prepreg | (g/m²) | 190 | 190 | 190 | 190 |
|  |  | Resin content of prepreg (component (C) is exposed as a part of matrix resin) | (wt %) | 34 | 34 | 34 | 34 |
|  |  | Resin particle content of prepreg | (g/m²) | 11 | 11 | 11 | 11 |
|  |  | Producing of prepreg |  | Method (γ) | Method (γ) | Method (γ) | Method (γ) |
| Molding conditions |  | Curing temperature | (° C.) | 180   180 | 180   180 | 180   180 | 180   180 |
|  |  | Rate of temperature increase | (° C./min.) | 2.0   0.5 | 2.0   0.5 | 2.0   0.5 | 2.0   0.5 |
| Evaluation of fiber-reinforced composite material |  | Glass transition temperature (non-water absorption) | (° C.) | 194   — | 186   — | 216   — | 214   — |
|  |  | Glass transition temperature (water absorption) | (° C.) | 149   — | 152   — | 165   — | 165   — |
|  |  | GIC (mode I interlayer toughness value) | (kJ/m²) | 1.7   0.5 | 1.5   0.7 | 0.8   0.4 | 0.7   0.5 |

TABLE 5-continued

| | | Example 9 | | Example 10 | | Example 11 | | Example 12 | |
|---|---|---|---|---|---|---|---|---|---|
| GIIC (mode II interlayer toughness value) | (kJ/m$^2$) | 3.0 | 1.0 | 3.1 | 1.9 | 2.7 | 2.5 | 2.4 | 2.3 |

In all of the examples, sufficiently high heat resistance with the glass transition temperature in the moisture absorption treatment is equal to or higher than 145° C. was obtained. In general, the interlayer toughness value of the fiber-reinforced composite material having high heat resistance tends to greatly decrease, and any of GIc or GIIc of the examples of the invention showed excellent interlayer fracture toughness, regardless of the rate of temperature increase.

According to the invention, it is possible to provide a prepreg and a fiber-reinforced composite material having excellent mode I interlayer fracture toughness and mode II interlayer fracture toughness which are stable regardless of the producing conditions such as the curing temperature or the rate in temperature increase.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST 1 molded article for evaluation
2 prepreg
3 fluorine resin film
20 component (B)
30 component (C)

What is claimed is:
1. A prepreg comprising:
(A) a reinforced fiber substrate;
(B) an epoxy resin composition comprising an epoxy resin component and a curing agent component; and
(C) a component (c1) comprising spherical polyamide particles having an average particle diameter of 2 to 50 μm and thermosetting polyimide particles having an average particle diameter of 2 to 50 μm, provided that the average particle diameter of the thermosetting polyimide particles is 0.5 to 10 times the average particle diameter of the spherical polyamide particles,
wherein the epoxy resin composition comprises 5 to 70 mass % of an epoxy resin having an oxazolidone ring structure or 60 to 100 mass % of an epoxy resin having a naphthalene structure, with respect to 100 mass % of the entire epoxy resin in (B),
wherein the curing agent component is an aromatic polyamine when the epoxy resin composition comprises 60 to 100 mass % of an epoxy resin having a naphthalene structure, with respect to 100 mass % of the entire epoxy resin in (B), and
wherein (B) and (C), together, account for 25 to 50 mass % of the prepreg.

2. The prepreg according to claim 1, wherein a mass ratio represented by [spherical polyamide particles]:[thermosetting polyimide particles] is 60:40 to 90:10.
3. The prepreg according to claim 1, wherein a melting point of the spherical polyamide particles in the component (c1) is 140° C. to 175° C.
4. The prepreg according to claim 1, wherein the spherical polyamide particles in the component (c1) is crystalline nylon copolymer particles.
5. The prepreg according to claim 1, wherein the spherical polyamide particles in the component (c1) is spherical particles comprising a copolymer of nylon 12 and nylon 6.
6. The prepreg according to claim 1, wherein the thermosetting polyimide particles has a chemical structure of General Formula (1) or General Formula (2):

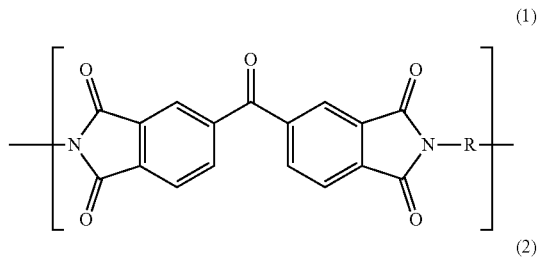

(1)

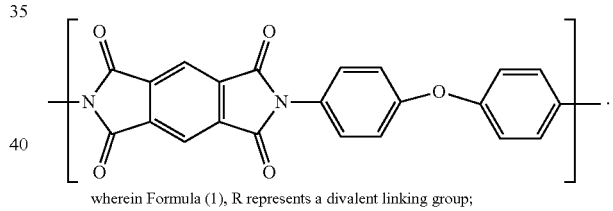

(2)

wherein Formula (1), R represents a divalent linking group;

7. The prepreg according to claim 1, wherein 70 mass % or more of the component (C) is present in a surface of the component (A).
8. The prepreg according to claim 1, wherein the component (A) comprises a reinforcing fiber, and the reinforcing fiber is a carbon fiber.
9. The prepreg according to claim 1, wherein the epoxy resin comprises 60 to 100 mass % of an epoxy resin having a naphthalene structure, with respect to 100 mass % of the entire epoxy resin in (B), and the curing agent component is an aromatic polyamine.
10. The prepreg according to claim 1, wherein a content of the component (C) is 5 to 25 parts by mass with respect to 100 parts by mass of the component (B).
11. A fiber-reinforced composite material obtained by laminating two or more prepregs according to claim 1 and heating the laminated prepregs to a temperature equal to or higher than, a curing temperature of the component (B).
12. A fiber-reinforced composite material comprising:
(A) a reinforced fiber substrate;
(B') a cured material of an epoxy resin composition comprising an epoxy resin component and a curing agent component; and (C) a component (c1) comprising spherical polyamide particles having an average particle diameter of 2 to 50 µm and thermosetting polyimide particles having an average particle diameter of 2 to 50 µm, provided that the average particle diameter of the thermosetting polyimide particles is 0.5 to 10 times the average particle diameter of the spherical polyamide particles, wherein the epoxy resin composition comprises 5 to 70 mass % of an epoxy resin having an oxazolidone ring structure or 60 to 100 mass % of an epoxy resin having a naphthalene structure, with respect to 100 mass % of the entire epoxy resin in (B), wherein the curing agent component is an aromatic polyamine when the epoxy resin composition comprises 60 to 100 mass % of an epoxy resin having a naphthalene structure, with respect to 100 mass % of the entire epoxy resin in (B), wherein (B) and (C) together, account for 25 to 50 mass % of the prepreg, a plurality of the component (A) are laminated, and the component (C) is present between layers of the components (A).

\* \* \* \* \*